US012154336B2

(12) United States Patent
Schuler et al.

(10) Patent No.: US 12,154,336 B2
(45) Date of Patent: Nov. 26, 2024

(54) INDICATING THAT CAPTURED DATA IS ASSOCIATED WITH AN UNCOMPLETED TASK OF AN INCIDENT

(71) Applicant: MOTOROLA SOLUTIONS, INC., Chicago, IL (US)

(72) Inventors: Francesca Schuler, Palatine, IL (US); Trent J. Miller, West Chicago, IL (US); Pietro Russo, Melrose, MA (US); Steven D. Tine, Cheshire, CT (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 389 days.

(21) Appl. No.: 17/806,683

(22) Filed: Jun. 13, 2022

(65) Prior Publication Data

US 2023/0401850 A1 Dec. 14, 2023

(51) Int. Cl.
*G06V 20/40* (2022.01)
*G08B 13/196* (2006.01)

(52) U.S. Cl.
CPC ....... *G06V 20/44* (2022.01); *G08B 13/19671* (2013.01)

(58) Field of Classification Search
CPC ...... G06Q 10/10; G06Q 50/18; G06Q 50/265; G06V 20/44; G06V 20/52; G08B 13/19671
See application file for complete search history.

(56) References Cited

U.S. PATENT DOCUMENTS

| 7,579,940 | B2 | 8/2009 | Schofield et al. |
| 8,161,172 | B2 | 4/2012 | Reisman |
| 8,850,507 | B2 | 9/2014 | Reisman |
| 9,467,750 | B2 | 10/2016 | Banica et al. |
| 10,607,040 | B1 | 3/2020 | Gan et al. |
| 10,635,906 | B1 | 4/2020 | Gan et al. |
| 10,846,532 | B2 | 11/2020 | Tov et al. |
| 11,073,972 | B2 | 7/2021 | Lim et al. |
| 11,210,631 | B2 | 12/2021 | Driscoll et al. |
| 2017/0277700 | A1 | 9/2017 | Davis et al. |
| 2018/0003513 | A1* | 1/2018 | Guzik ................ G01C 21/3407 |
| 2018/0122143 | A1 | 5/2018 | Ellwood, Jr. |

(Continued)

OTHER PUBLICATIONS

Orr et al, "Investigating the Routine Dispatch Tasks Performed by Police Officers", 2020. (Year: 2020).*

*Primary Examiner* — Ruiping Li
(74) *Attorney, Agent, or Firm* — Michael Best & Friedrich LLP

(57) ABSTRACT

One example device includes an electronic processor configured identify, based on an incident type and a role of an object associated with a public safety incident, an uncompleted task that is to be performed by a public safety officer and that is associated with the object associated with the public safety incident. The electronic processor may be configured to identify first data included in a captured data file associated with the public safety incident that was generated at least partially by monitoring the object. The electronic processor may be configured to determine a time period within the captured data file during which the first data is identified to be present, and display an indication of the uncompleted task and at least one of the time period within the captured data file, the first data, and a user-selectable link to allow a user to consume the first data.

20 Claims, 12 Drawing Sheets

(56) References Cited

U.S. PATENT DOCUMENTS

| | | |
|---|---|---|
| 2019/0189159 A1 | 6/2019 | Gan et al. |
| 2020/0134760 A1* | 4/2020 | Messerges ............. G07C 13/00 |
| 2021/0192422 A1* | 6/2021 | Gutsol .................. G06Q 50/26 |
| 2021/0263965 A1 | 8/2021 | Li et al. |

* cited by examiner

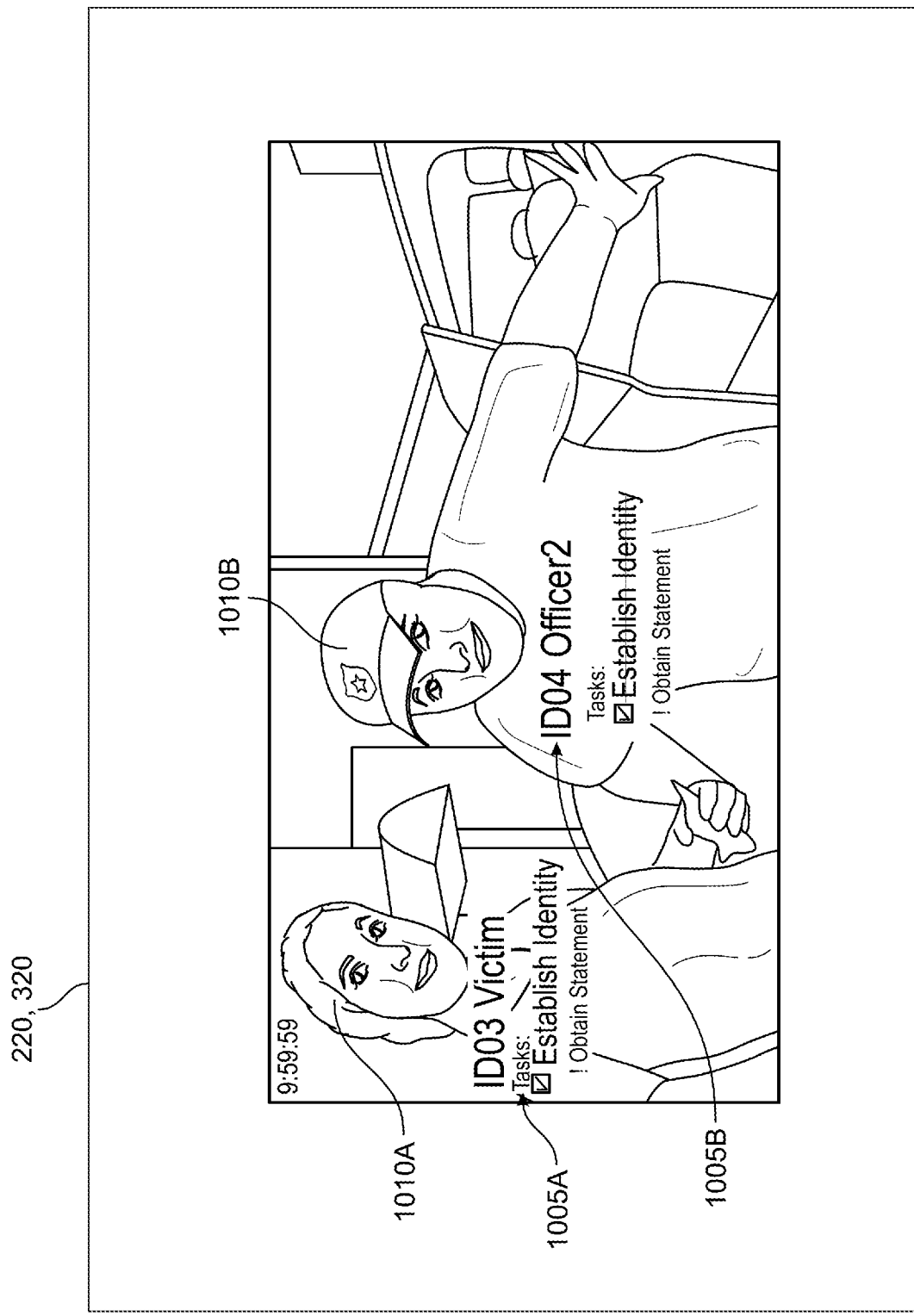

INDICATING THAT CAPTURED DATA IS ASSOCIATED WITH AN UNCOMPLETED TASK OF AN INCIDENT

BACKGROUND OF THE INVENTION

Public safety personnel (for example, first responders, detectives, and the like) may handle many public safety incidents on a daily, weekly, monthly, and/or yearly basis. While a public safety incident may end in a few minutes or in a few hours, ongoing investigation and other tasks may be expected to be completed after the incident has ended, for example in order to close a case file associated with the incident. Public safety records are often generated and stored to keep track of information related to public safety incidents.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate aspects, features, and embodiments of concepts that include the claimed invention, and explain various principles and advantages of those aspects, features, and embodiments.

FIG. 10 illustrates a screenshot of a display including an annotation of an uncompleted task overlaid with first data in the form of a video according to one example aspect.

Figure 1:
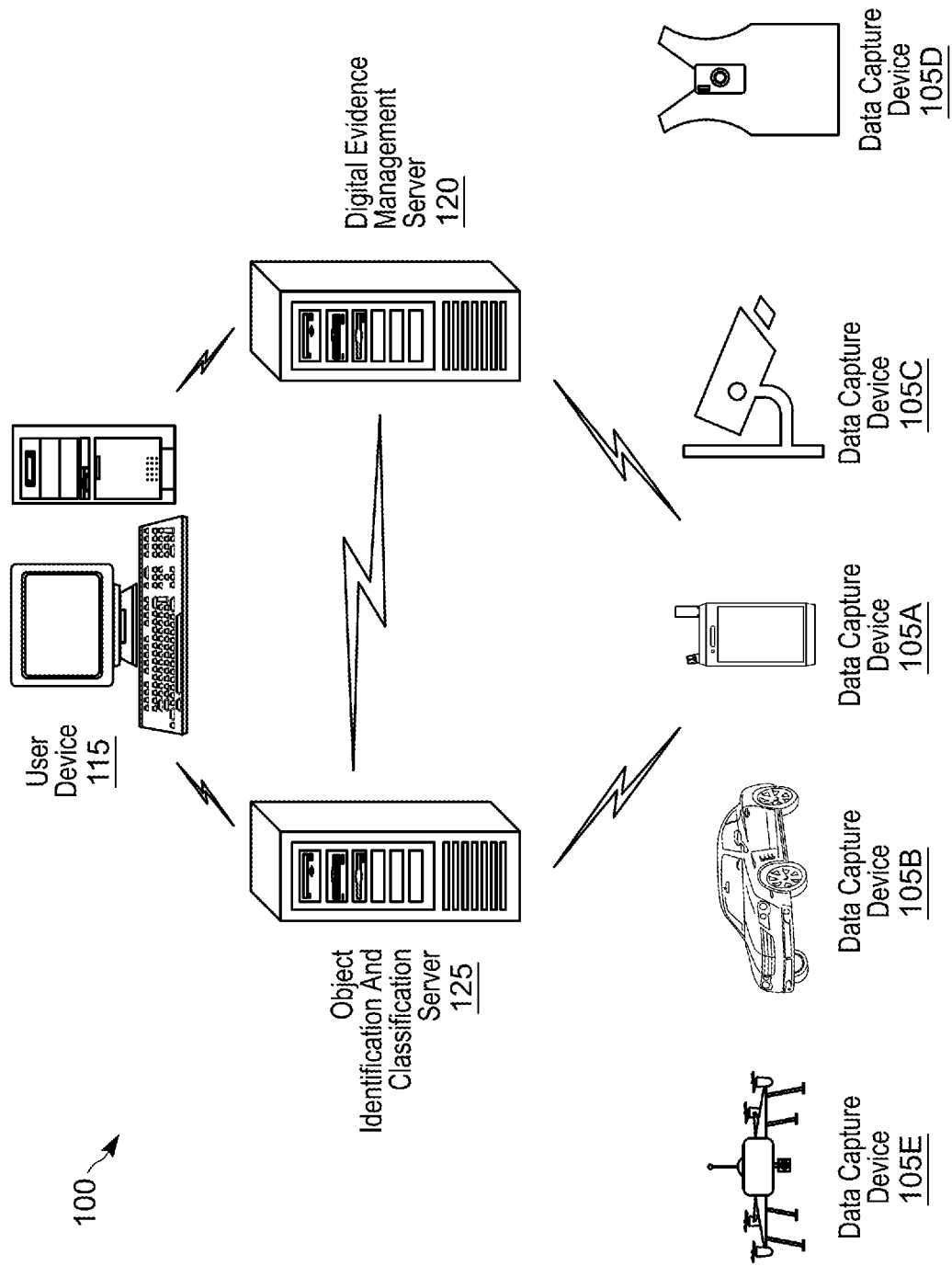
FIG. 1 is a diagram of a communication system according to one example aspect.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of aspects, features, and embodiments.

The apparatus and method components have been represented where appropriate by conventional symbols in the drawings, showing only those specific details that are pertinent to understanding the aspects, features, and embodiments of the present invention so as not to obscure the disclosure with details that will be readily apparent to those of ordinary skill in the art having the benefit of the description herein.

DETAILED DESCRIPTION OF THE INVENTION

As explained above, public safety records may include information related to many different public safety incidents. The records of at least some of these incidents may indicate that there are one or more uncompleted tasks that still need to be performed by a public safety officer. For example, even though an incident has ended (for example, a fight has been broken up by a police officer), uncompleted tasks may be associated with the incident in a database that stores a public safety record of the incident. Continuing the above example where the incident is a fight, uncompleted tasks may include interviewing one or more witnesses, identifying an additional victim, and/or the like. Uncompleted tasks may exist within a public safety record for days or weeks after the incident has ended.

Public safety records are often heavily text-based and may lack context information that allows a public safety officer to easily recall the particular incident or a particular portion of the incident while reviewing a public safety record to, for example, complete an incident report and/or close out the record by completing any outstanding uncompleted tasks. For example, text of a public safety record may indicate that one of the witnesses has still not been identified. However, the text of the public safety record may not indicate other information about the witness that may aid a public safety officer in recalling a physical appearance of the witness, a voice tone of the witness, and/or the like. While the public safety record may include one or more videos (or other captured data files as explained in greater detail below) of the incident, these videos or portions of one or more videos are not specifically indicated to include relevant time periods during which an object of interest (e.g., the witness) was monitored.

Accordingly, there are technological problems with public safety records and displaying information included in public safety records. For example, one technological problem is that a textual public safety record does not link missing/incomplete information of the public safety record to a specific time period of unstructured data (e.g., a previously stored captured data file) such as an audio file or a video file. As another example, another technological problem is that objects viewable in a video file (e.g., citizens and/or other objects) do not show a prioritized lists of tasks to be completed that are associated with a respective object. In other words, there are technological problems with public safety records and displaying of information included therein due to a lack of linking of stored captured data with objects of interest that are associated with uncompleted tasks of the incident that are to be performed by a public safety officer. For example, interaction between a user (e.g., a public safety officer completing an incident report by reviewing an incident record) and a user device that allows the user to consume captured data stored in the incident report is inefficient because the user may have to search and consume many pieces of captured data before locating a desired or useful portion of captured data. In addition to wasted time experienced by the user, this inefficient searching and consumption results in unnecessary usage of user device resources to retrieve and output data that is not very useful to the user. Such unnecessary usage reduces functionality of the user device, for example, by consuming additional battery power, consuming additional processing power, and/or generally consuming usage time of the user device that has a finite usage life.

To address the above-noted technological problems, disclosed are, among other things, methods, devices, and systems to link stored captured data with objects of interest that are associated with uncompleted tasks of a public safety incident. The disclosed methods, devices, and systems accelerate the process of closing public safety incidents/cases/investigations by correlating and emphasizing prioritized tasks to task owners (e.g., public safety officers) in order to close the public safety incident/case/investigation. Additionally, the disclosed methods, devices, and systems enhance stored captured data records (e.g., video records, audio records, etc.) to accelerate recollection/re-orientation of a public safety officer to a public safety incident/case/investigation when the public safety officer is reviewing information about the public safety incident. The disclosed methods, devices, and systems improve the interaction between the user and a user device that allows the user to consume captured data associated with the public safety incident. In other words, the disclosed methods, devices, and systems improve user experience of a user device to allow the interaction between the user and the user device to be more efficient and less time consuming. Using the disclosed methods, devices, and systems, the user can more quickly and efficiently identify relevant information associated with uncompleted tasks associated with a public safety incident. For example, a public safety officer can more quickly complete an incident report by establishing/recalling context information for one or more uncompleted tasks. Additionally, this more efficient usage of the user device reduces additional battery power, additional processing power, and general usage time that is consumed by the user device to, for example, extend the usable life of the user device.

One embodiment provides an electronic computing device that may include an electronic processor that may be configured to receive a captured data file associated with a public safety incident. The electronic processor may be further configured to receive identifying information about the public safety incident. The identifying information about the public safety incident may include an incident identifier, an incident type, and a role of an object associated with the public safety incident. The electronic processor may be further configured to identify, based on the incident type and the role of the object associated with the public safety incident, an uncompleted task that is to be performed by a public safety officer and that is associated with the object associated with the public safety incident. The electronic processor may be further configured to identify first data included in the captured data file. The first data may have been generated at least partially by monitoring the object. The electronic processor may be further configured to determine a time period within the captured data file during which the first data is identified to be present within the captured data file. The electronic processor may be further configured to display, on a display, an indication of the uncompleted task and at least one selected from the group consisting of the time period within the captured data file, the first data, a user-selectable link to allow a user to consume the first data, and combinations thereof.

Another embodiment provides a method of displaying data. The method may include receiving, with an electronic processor of an electronic computing device, a captured data file associated with a public safety incident. The method may further include receiving, with the electronic processor, identifying information about the public safety incident. The identifying information about the public safety incident may include an incident identifier, an incident type, and a role of an object associated with the public safety incident. The method may further include identifying, with the electronic processor and based on the incident type and the role of the object associated with the public safety incident, an uncompleted task that is to be performed by a public safety officer and that is associated with the object associated with the public safety incident. The method may further include identifying, with the electronic processor, first data included in the captured data file. The first data may have been generated at least partially by monitoring the object. The method may further include determining, with the electronic processor, a time period within the captured data file during which the first data is identified to be present within the captured data file. The method may further include displaying, on a display, an indication of the uncompleted task and at least one selected from the group consisting of the time period within the captured data file, the first data, a user-selectable link to allow a user to consume the first data, and combinations thereof.

For ease of description, some or all of the example systems and devices presented herein are illustrated with a single example of each of its component parts. Some examples may not describe or illustrate all components of the systems or devices. Other example aspects, features, and embodiments may include more or fewer of each of the illustrated components, may combine some components, or may include additional or alternative components.

In some instances, a public safety incident includes an incident in which public safety officers are supervising, maintaining order, providing assistance, and the like. In some instances, the public safety incident is an event, occurrence, or situation in which officers are involved. For example, the public safety incident may be an incident in which public safety officers are called to a location to provide assistance in resolving or preventing a societal or environmental problem (for example, a location where a suspect is committing or has committed a crime, a fire, a vehicular accident, a traffic stop, a location where a natural disaster such as a tornado or earthquake has occurred, and the like). In some instances, public safety incidents include incidents involving public service agencies (for example, waste disposal agencies, water management agencies, and the like). In some instances, public safety officers include police officers, paramedics, firefighters, dispatchers, and the like. In some instances, public safety officers/personnel include public service employees and/or other employees employed by public service agencies.

FIG. 1 is a diagram of a communication system 100 according to one example. In the example illustrated, the communication system 100 includes data capture devices 105A, 105B, and 105C, 105D, and 105E. In the following description, when explaining how a single data capture device functions, a reference to data capture device 105 is used. As indicated in FIG. 1, it is not necessary, however, that the data capture devices 105A through 105E are identical. The data capture devices 105A through 105E are merely examples. In some instances, the communication system 100 may include more or fewer data capture devices 105 than illustrated in FIG. 1.

In some instances, the data capture devices 105 communicate with each other and/or with servers (e.g., a digital evidence management server (DEMS) 120, an object identification and classification server (OICS) 125, and/or the like) over a communication network including one or more radio frequency (RF) site controllers, base stations, or the like (for example, by sending and receiving radio signals to and from an RF site controller, a base station, or the like). The communication network may include wireless and wired portions. For example, at least some of the data capture devices 105 may be wired cameras (e.g., receiving power over a wired connection and/or providing captured data to other devices in the communication system 100 over a wired connection). All or parts of the communication network may be implemented using various existing specifications or protocols. In some instances, the communication network is implemented using a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other instances, the communication network implements the Long Term Evolution (LTE) (including LTE-Advanced or LTE-Advanced Pro compliant with, for example, the $3^{rd}$ Generation Partnership Project (3GPP) Technical Specification (TS) 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over Internet Protocol (IP) (VoIP), or a PTT over IP (PoIP) application may be implemented. The communication network may also include future developed networks. In some instances, the communication network may also include a combination of the networks mentioned. In some instances, the data capture devices 105 may communicate directly with each other using a communication channel or connection (e.g., a wired connection) that is outside of the communication network. For example, the data capture devices 105A through 105E may communicate directly with each other when they are within a predetermined distance from each other using short-range communication mechanisms such as Bluetooth® links.

In some instances, the communication system 100 includes a user device 115, a digital evidence management server (DEMS) 120, and an object identification and classification server (OICS) 125. In some instances, the DEMS 120 stores public safety records that may include information related to many different public safety incidents. The DEMS 120 may be operated and maintained by one or more public safety agencies or a provider operating on behalf of the one or more public safety agencies. The DEMS 120 may receive captured data files from one or more data capture devices 105. For example, captured data files received by the DEMS 120 may include at least one selected from the group of an image file, a video file, an audio file, a telemetry data file, and combinations thereof. In some instances, a telemetry data file includes captured data from a sensor such as a heart rate of a person, a temperature of a person or environment, a humidity level of an environment, etc. In some embodiments, a captured data file includes previously stored or live (i.e., captured in real-time and streamed as data is captured) audio, two-dimensional video, three-dimensional video, infrared images, radar, images, and/or the like. In some embodiments, the data capture devices 105 also provides incident-related data such as an incident name, an incident type, an incident identifier, and/or the like. For example, metadata associated with the captured data file may include this incident-related data and may be determined or received, for example, in the same manner as described below with respect to data received from the user device 115. For example, the incident-related data may be entered by a user (e.g., by a public safety officer on the data capture device 105) and/or may be determined by the data capture device 105 cross-referencing a location and time of an incident associated with an incident record with a location and time that the data capture device 105 captured the data.

In some instances, the DEMS 120 also receives data from the user device 115. For example, a public safety officer may enter information into an input device of the user device 115 to store the information in the DEMS 120. In some instances, the user device 115 provides information that is stored as part of a public safety record in the DEMS 120. The user device 115 also may be used to allow a user to label/categorize captured data received from one or more data capture devices 105, for example, as being related to a particular public safety incident. For example, each public safety incident may include an incident identifier to allow the DEMS 120 to keep track of all information related to a respective public safety incident using the same incident identifier. The user device 115 may be operated and maintained by a public safety agency, for example, at a public safety command center. For example, the user device 115 may include a detective's terminal, a fusion center terminal, a dispatch terminal, or another terminal located at a public safety command center. In some embodiments, such terminals are fixed terminals that are not configured to be portable/mobile.

In some instances, the DEMS 120 transmits stored data (e.g., stored captured data from a data capture device 105) to the OICS 125. In some instances, the OICS 125 additionally or alternatively receives captured data directly from one or more data capture devices 105. As explained in greater detail below, the OICS 125 is configured to identify objects being monitored by the captured data and classify the objects, for example, as a person in general, a specific person, a specific object, etc. In some instances, the OICS 125 receives identification and/or classification information associated with captured data from the user device 115 via user input. In some instances, the OICS 125 transmits object identification and/or classification information to the DEMS 120 to be stored at the DEMS 120. In some instances, the OICS 125 transmits object identification and/or classification information to the user device 115 to be consumed by a user and/or to aid a user in selecting which captured data to consume as explained in greater detail below. In some embodiments, an object of interest (i.e., an object) includes an object detected in a captured data file such as video data and/or audio data (e.g., using artificial intelligence and/or computer vision with trained data).

Although the DEMS 120, the OICS 125, and the user device 115 are shown as separate devices in FIG. 1, in some instances, two or more of these devices 115, 120, and 125 may be combined in some instances. Additionally, although only a single instance of each of the devices 115, 120, and 125 is shown in FIG. 1, these devices 115, 120, and 125 may include multiple devices. For example, the communication system 100 may include multiple user devices 115. As another example, the DEMS 120 may include multiple servers. As indicated previously herein, communication between any of the devices shown in FIG. 1 (e.g., the DEMS 120, the OICS 125, the user device 115, and/or the data capture devices 105 may be wired or wireless communication.

As illustrated by the data capture device 105A of FIG. 1, the data capture device 105 may be a handheld communication device, for example, a mobile telephone or other portable communication device, laptop computer, tablet computer, smart watch or other smart wearable (e.g., see data capture device 105D illustrated as a body-worn camera). As illustrated by the data capture devices 105B and 105E of FIG. 1, the data capture device 105 may be a mobile device that is located in or that is a part of a vehicle (e.g., a police vehicle, a fire truck, etc.) (see data capture device 105B), a drone or unmanned aerial vehicle (see data capture device 105E), or may be another device configured to communicate over the communication network described previously herein. As illustrated by the data capture device 105C of FIG. 1, the data capture device 105 may be a security monitoring device/camera, a traffic monitoring device/camera, or the like. Some data capture devices 105 may be stationary/fixed in some instances. For example, the data capture devices 105 may include a fixed security camera system and/or traffic monitoring camera system with wired connections for communication and/or power. In some instances, the data capture device 105 may be a handheld radio carried by a public safety officer or first responder, such as a police officer. In other words, data capture devices 105 may include portable/mobile wireless devices 105 and/or fixed, wired (i.e., non-wireless) devices 105.

Although the user device 115 is shown separately from the data capture devices 105, in some instances, one or more data capture devices 105 may function as a user device 115. For example, an application stored and executed by the data capture device 105 may allow the data capture device 105 to perform the functionality of the user device 115 described herein. In some instances, the user device 115 may be a device maintained, for example, at a call center or public safety command center (for example, a desktop computer, a tablet, or the like).

FIG. 1 illustrates only one example instance of the communication system 100. In other instances, the system 100 may include more or fewer components and may perform functions that are not explicitly described herein. For example, the communication system 100 may include additional data capture devices 105, user devices 115, DEMSs 120, and/or OICSs 125. Further, in some instances, one or more devices of the communication system 100 are combined into a single device.

Although each of the data capture devices 105, the user device 115, the DEMS 120, and the OICS 125 are described herein as performing distinct functions, in some instances, the functionality performed by these devices is distributed differently within the communication system 100. In some instances, the user device 115, the DEMS 120, the OICS 125, one or more of the data capture devices 105, and/or a combination thereof are referred to as an electronic computing device that performs the functionality described herein. For example, the electronic computing device may be a single electronic processor (for example, the fourth electronic processor 505 of the OICS 125) or a plurality of electronic processors located in the OICS 125. In other instances, the electronic computing device includes multiple electronic processors distributed across different devices. For example, the electronic computing device is implemented on one or more of the second electronic processor 305 of the user device 115, the third electronic processor 405 of the DEMS 120, the fourth electronic processor 505 of the OICS 125, and one or more electronic processors located in one or more other devices located at a public safety command center, at a remote location, or at a remote cloud-computing cluster.

Figure 2:
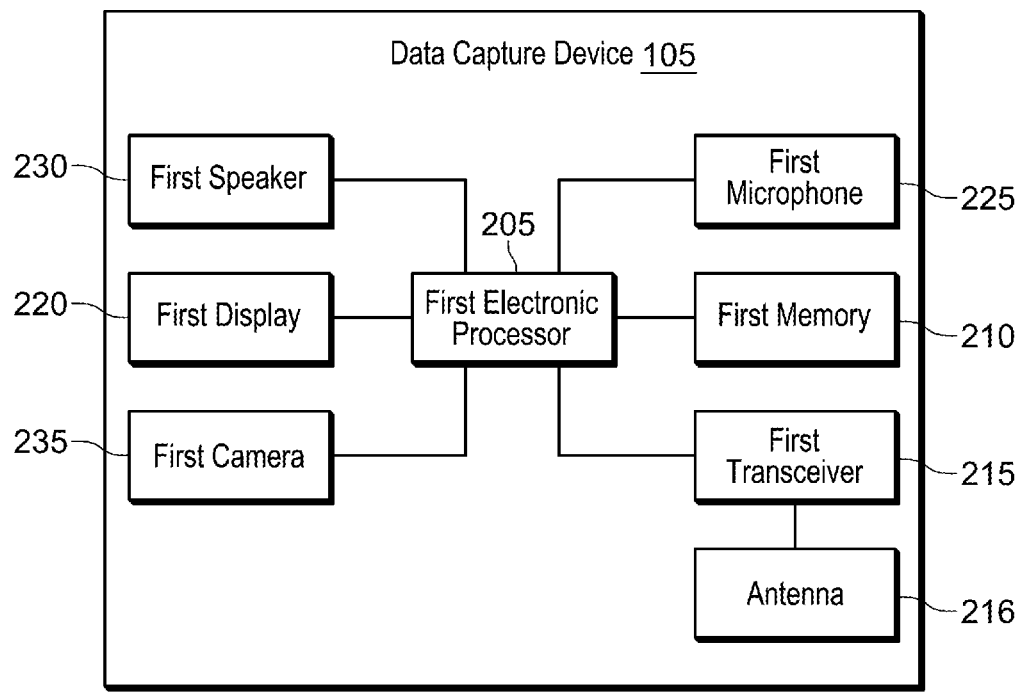
FIG. 2 is a diagram of a data capture device included in the communication system of FIG. 1 according to one example aspect.

FIG. 2 is a block diagram of a data capture device 105 of the communication system 100 according to one example instance. In the example shown, the data capture device 105 includes a first electronic processor 205 (for example, a microprocessor or another electronic device). The first electronic processor 205 may include input and output interfaces (not shown) and be electrically connected to a first memory 210, a first transceiver 215 including or connected to an antenna 216 (the combination of which may be referred to as a first network interface), a first display 220, a first microphone 225, a first speaker 230, and a first camera 235.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform at least some of the methods described herein.

The combination of the first transceiver 215 and the antenna 216 (i.e., the first network interface) sends and receives data to and from other devices in the communication system 100 (for example, over the communication network described previously herein). For example, the first transceiver 215 is a wireless communication transceiver for wirelessly communicating with other devices. Alternatively or in addition, the first network interface may include a connector or port for receiving a wired connection to the communication network, such as an Ethernet cable. The first electronic processor 205 receives electrical signals representing sound from the first microphone 225 and may communicate information relating to the electrical signals to other devices through the first transceiver 215 and the antenna 216 (for example, to another data capture device 105, to the DEMS 120, etc.). Similarly, the first electronic processor 205 receives image and/or video data captured by the first camera 235 and may communicate information relating to the image and/or video data to other devices through the first transceiver 215 and the antenna 216 (for example, to another data capture device 105, to the DEMS 120, etc.). The first electronic processor 205 may also output data received via the first network interface, for example from another data capture device 105, through the first speaker 230, the first display 220, or a combination thereof. Herein, when the terms "video" or "video data" are used, it should be understood that these terms encompass images and image data as well as videos and video data that include a series of frames/images.

In some instances, the data capture device 105 may include fewer or additional components in configurations different from that illustrated in FIG. 2. For example, in some instances, the data capture device 105 includes one or more additional cameras, a location component (for example, a global positioning system (GPS) receiver), and a push-to-talk (PTT) mechanism/button. As another example, the data capture device 105C (e.g., a security camera) may not include the first display 220 and/or the first speaker 230 while the data capture devices 105A and 105B include these components. In some instances, the data capture device 105 performs additional functionality than the functionality described below.

Figure 3:
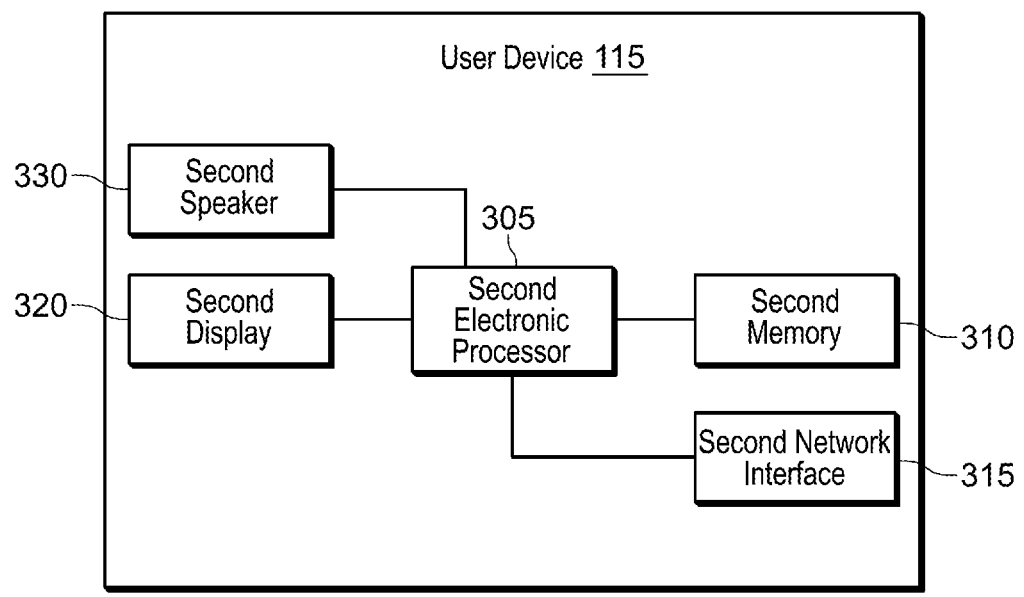
FIG. 3 is a diagram of a user device included in the communication system of FIG. 1 according to one example aspect.

FIG. 3 is a block diagram of the user device 115 according to one example instance. In the example illustrated, the user device 115 is a computer that includes a second electronic processor 305, an input/output interface (not shown), a second memory 310, a second network interface 315 (for example, including a transceiver and an antenna), a second display 320, and a second speaker 330. These components are similar to those described above with respect to the data capture device 105 and perform similar general functions. In some instances, the user device 115 may include fewer or additional components in configurations different from that illustrated in FIG. 3. For example, in some instances, the user device 115 also includes a microphone and/or a camera similar to that described above with respect to the data capture device 105. In fact, as explained previously herein, in some instances, a data capture device 105 may act as a user device 115, for example, by performing the functionality of the user device 115 described herein. In some instances, the user device 115 performs additional functionality than the functionality described herein.

Figure 4:
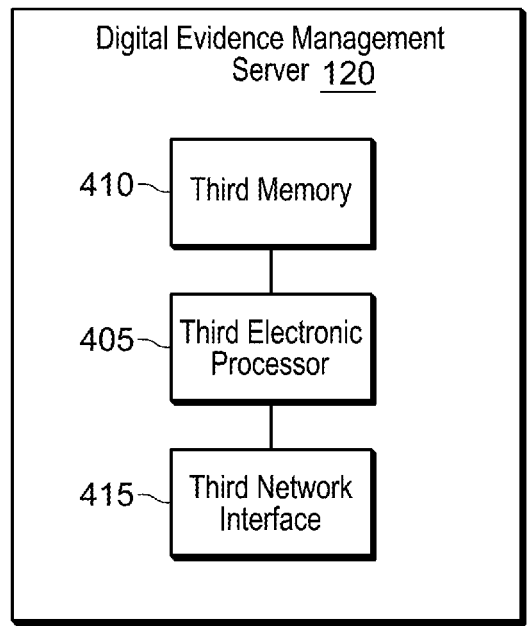
FIG. 4 is a diagram of a digital evidence management server (DEMS) included in the communication system of FIG. 1 according to one example aspect.

FIG. 4 is a block diagram of the DEMS 120 according to one example instance. In the example illustrated, the DEMS 120 is a computer that includes a third electronic processor 405, an input/output interface (not shown), a third memory 410, and a third network interface 415 (for example, including a transceiver and an antenna). These components are similar to those described above with respect to the data capture device 105 and perform similar general functions. In some instances, the DEMS 120 may include fewer or additional components in configurations different from that illustrated in FIG. 4. For example, in some instances, the DEMS 120 also includes a display. In some instances, the DEMS 120 performs additional functionality than the functionality described herein. In some instances, the DEMS 120 communicates with other devices of the communication system 100 to receive and store information and to provide stored information (e.g., public safety records) to other devices of the system 100 as explained in greater detail below.

Figure 5:
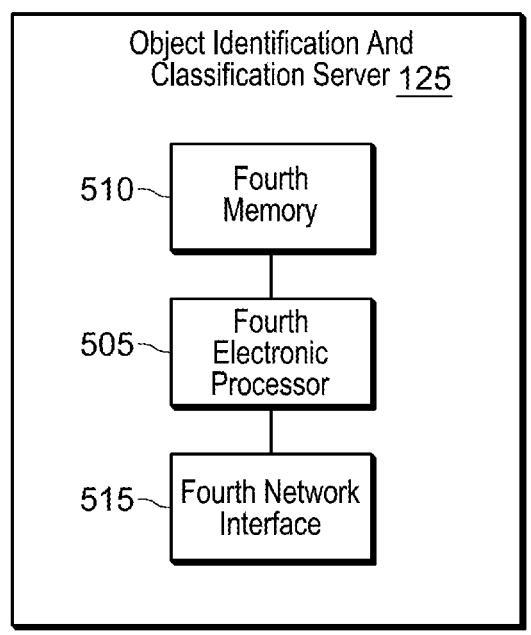
FIG. 5 is a diagram of an object identification and classification server (OICS) included in the communication system of FIG. 1 according to one example aspect.

FIG. 5 is a block diagram of the OICS 125 according to one example instance. In the example illustrated, the OICS 125 is a computer that includes a fourth electronic processor 505, an input/output interface (not shown), a fourth memory 510, and a fourth network interface 515 (for example, including a transceiver and an antenna). These components are similar to those described above with respect to the data capture device 105 and perform similar general functions. In some instances, the OICS 125 may include fewer or additional components in configurations different from that illustrated in FIG. 5. For example, in some instances, the OICS 125 also includes a display. In some instances, the OICS 125 performs additional functionality than the functionality described herein.

Figure 6:
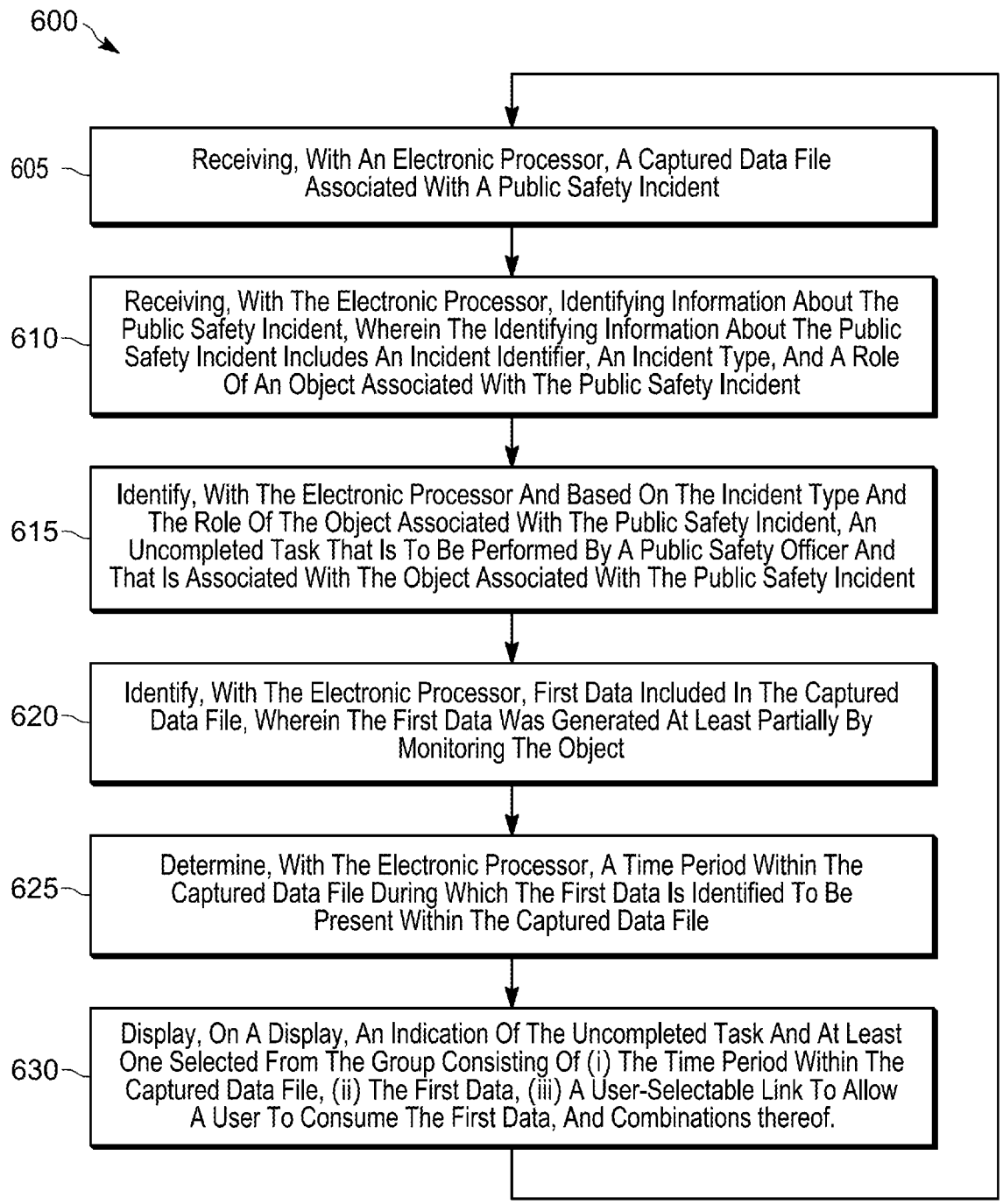
FIG. 6 is a flowchart of a method to indicate that captured data is associated with an uncompleted task of a public safety incident according to one example aspect.

FIG. 6 illustrates a flowchart of a method 600 performed by one or more electronic processors of the electronic computing device described previously herein to indicate that captured data is associated with an uncompleted task of a public safety incident. While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure. For the sake of readability, the below explanation refers to "the electronic processor" of the electronic computing device performing steps of the method 600. Nevertheless, it should be understood that the steps and sub-steps of the method 600 may be performed by any one or a combination of different electronic processors of the electronic computing device.

At block 605, an electronic processor of the electronic computing device may receive a captured data file associated with a public safety incident. For example, the fourth electronic processor 505 of the OICS 125 may receive the captured data file from the DEMS 120 (i.e., a records database), directly from a data capture device 105, or from both the DEMS 120 and one or more data capture devices 105. The captured data file received by the OICS 125 may include at least one selected from the group of an image file, a video file, an audio file, a telemetry data file, and combinations thereof. As explained previously herein, the captured data file may include previously stored data or live/streamed data that is currently being captured by a data capture device 105. The captured data file may include other types of data files as explained previously herein.

In some instances, the OICS 125 retrieves the captured data file from the DEMS 120 in response to receiving a request from the user device 115 indicating that a user desires to consume the specific captured data file or data files associated with a specific public safety incident for which the captured data file includes monitored information. In some instances, at block 605, the electronic computing device receives a plurality of captured data files that are, for example, associated with the same public safety incident (e.g., the specific public safety incident requested by the user device 115).

At block 610, the electronic processor of the electronic computing device may receive identifying information about the public safety incident. For example, the fourth electronic processor 505 of the OICS 125 may receive the identifying information from the DEMS 120 (i.e., a records database), directly from a data capture device 105, or from both the DEMS 120 and one or more data capture devices 105. In some instances, the identifying information about the public safety incident includes an incident identifier, an incident type, and a role of an object associated with the public safety incident. The identifying information may be stored in a public safety record associated with the incident in the DEMS 120.

In some instances, the incident identifier may include an identification number that is unique to each particular incident such that the DEMS 120 can store and associate information (e.g., multiple captured data files, multiple reports by public safety officers, etc.) about each incident with a specific respective incident.

In some instances, the incident type indicates one of a plurality of types of incidents that are handled by one or more public safety agencies. For example, different incident types may be handled by different public safety agencies, different public safety officers within the same agency, and/or in a different manner depending on the type of incident. For example, a fire may be primarily handled by firefighters with back-up support being provided by police officer and/or paramedics. As another example, a large commercial fire may require more follow-up investigation than a small residential fire and may accordingly be handled by additional investigative personnel. Examples of types of incidents include, but are not limited to a homicide, a fight, a fire, a vehicular accident, a traffic stop, a natural disaster such as a tornado or earthquake, and the like.

In some instances, each type of incident is associated with a plurality of tasks that are expected to be completed by public safety officers during or after the incident. For example, for a homicide, the plurality of tasks may include identification of the victim, identification of one or more witnesses, identification of one or more suspects, interviewing of a witness and/or a suspect, etc.

In some instances, the plurality of tasks associated with an incident type are programmed into the electronic computing device by a public safety officer and can be adjusted as desired to be specific to a particular public safety agency. In some instances, the plurality of tasks for a first incident of a first type may be different than for a second incident of the same type due to differences in stored information that indicate differences between the first incident and the second incident. For example, when four people are identified as being involved in the first incident, tasks associated with each of these four people may be associated with the first incident. However, if only two people are identified as being involved in the second incident, tasks associated with each of these two people may be associated with the second incident (i.e., less tasks for the second incident than the first incident even though the incidents are of the same type).

In some instances, an object associated with a public safety incident includes a person or object involved in the public safety incident (e.g., Officer Smith, John Doe, a gun, a knife, etc.). In some instances, a role of an object associated with the public safety incident indicates why a person or object is relevant to a respective particular incident. For example, a person may be identified as (i) a responding public safety officer on the scene of the incident, (ii) a dispatcher who primarily handled calls relating to the incident, (iii) a victim of a crime, (iv) a suspect or confirmed perpetrator of a crime, (v) a witness, or the like. As another example, a gun or knife may be identified as a homicide weapon. As another example, a smart phone or a piece of jewelry may be identified as a stolen item. In some instances, certain roles of objects may be expected to be associated with an incident based on the type of incident. For example, a homicide incident may be expected to include at least objects with roles of victim and suspect/perpetrator. As another example, a traffic stop incident may be expected to include at least objects with roles of vehicle, driver, and patrolling officer. In some instances, the expected roles of objects based on incident type may be user-adjustable, for example, via the user device 115.

In some instances, the above-explained identifying information about the public safety incident is stored in the DEMS 120 in response to analysis of captured data files and/or based on user input(s) received on a data capture device 105 and/or the user device 115. For example, upon receipt of a captured data file, the electronic computing device may analyze the captured data file to identify objects included in the data file. In some instances, the electronic computing device may use video analytics to perform object recognition in a video file and/or using audio analytics to perform sound recognition in an audio file. For example, the electronic computing device may use facial recognition to identify a public safety officer or a civilian included in video footage. The electronic computing device may then store the name of the officer in a public safety record of the incident as an officer on scene handling the incident. As another example, the electronic computing device may use voice recognition of audio footage to make similar identifications.

As an example of storing information in a public safety record based on user input(s) received on a data capture device 105 and/or the user device 115, the DEMS 120 may receive incident information that is input by an officer handling the incident, by a dispatcher handling the incident, and/or by other public safety personnel. For example, in conjunction with sending a video of an incident, a public safety officer may use their data capture device 105 (e.g., a body-worn camera and associated communication device(s)) to indicate the type of incident. Additionally or alternatively, based on the data capture device 105 that the video was received from, the DEMS 120 may determine that a certain officer is present at the scene of the incident or that the video was obtained from a certain location (e.g., a location of a fixed/stationary security camera 105C that is providing the video). The DEMS 120 may accordingly populate the stored information in the public safety record associated with the incident. As another example, after the incident has ended, the officer who handled the incident, their supervisor, and/or the dispatcher who handled the incident may populate information in the public safety record associated with the incident, for example, using the user device 115 and/or a data capture device 105.

Figure 12:
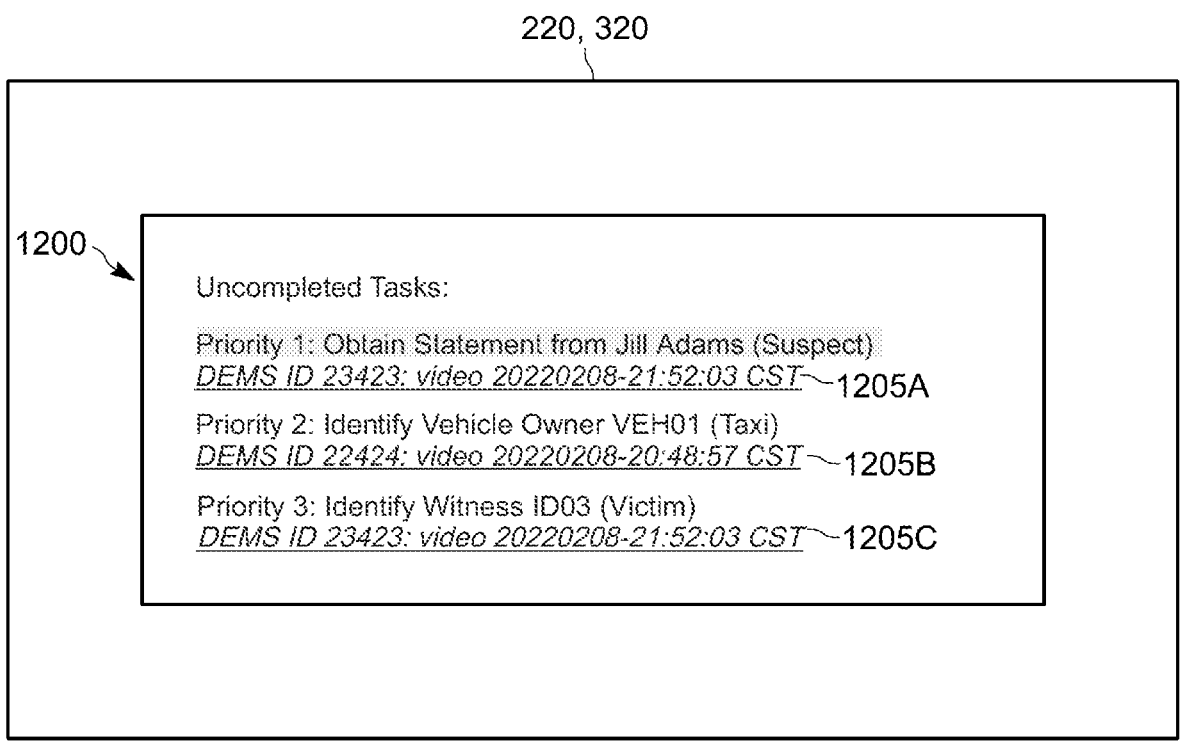
FIG. 12 illustrates a screenshot of a display including an indication of an uncompleted task along with one or more user-selectable links within a prioritized list of uncompleted tasks associated with a public safety incident according to one example aspect.
Figure 13:
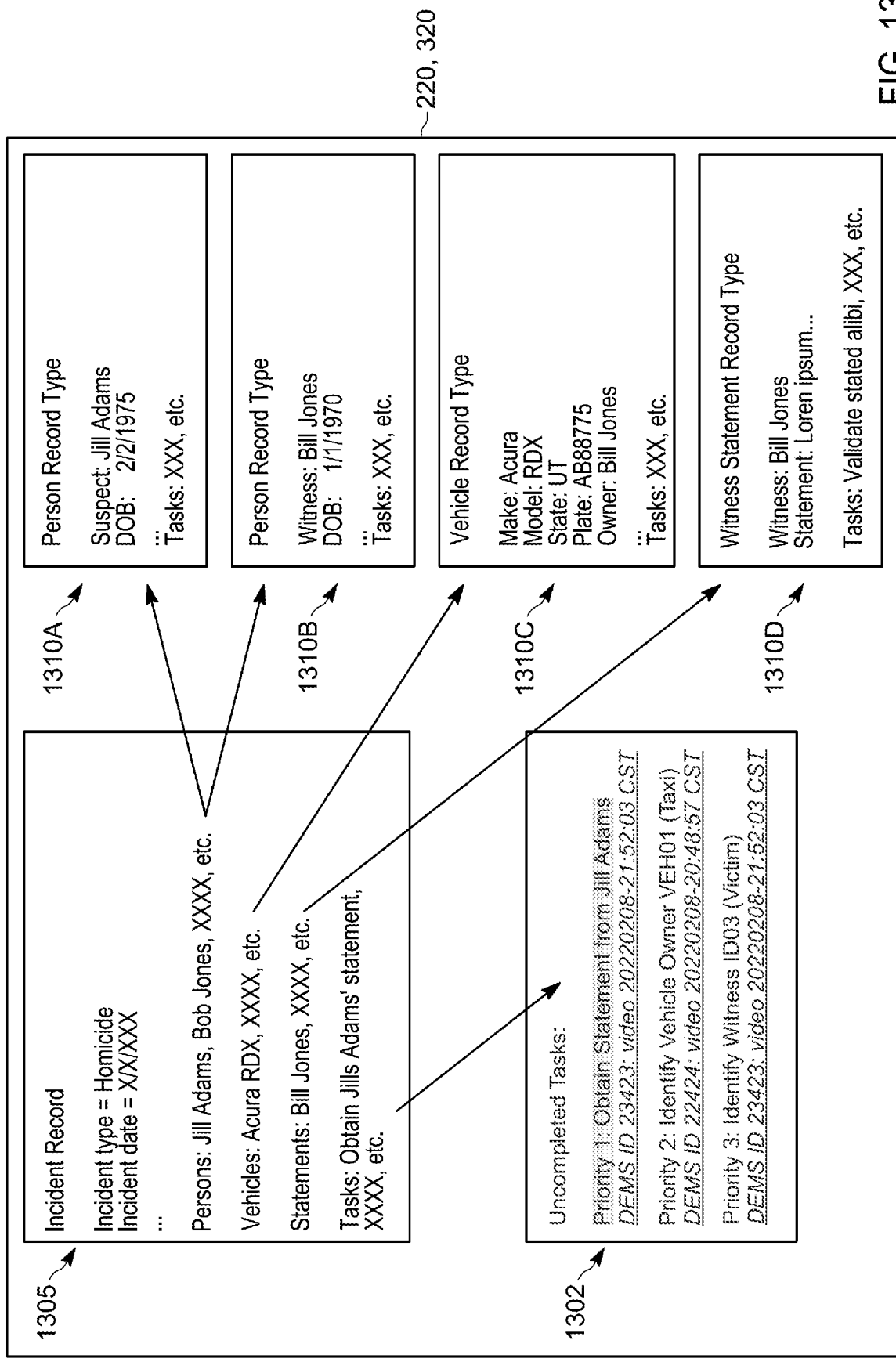
FIG. 13 illustrates an example screenshot of a display including a public safety record that includes example record types according to one example aspect.

FIG. 13 illustrates an example screenshot of the electronic computing device controlling a display 220, 320 to display a public safety record that includes example record types. A main window 1305 may include different types of information about a public safety incident associated with the incident record (e.g., incident type, incident date, persons, vehicles, statements, tasks, etc.). In some embodiments, at least some of the elements listed in the main window 1305 (e.g., a person's name, a vehicle name/identifier, a statement identifier, the titles that indicate a record type such as the titles "persons," "vehicles," etc. and/or the like may be a user-selectable link that, when selected via a user input, causes a respective sub-window 1310 to be displayed. A reference herein to sub-window 1310 may refer to sub-window 1310A, 1310B, 1310C, 1310D, or combinations thereof. For example, one of the persons listed in the main window 1305 may be selected to have detailed information about the person displayed in a sub-window 1310. For example, sub-window 1310A provides information about a suspect Jill Adams while sub-window 1310B provides information about a witness Bill Jones. The respective information shown in the sub-windows 1310A-B may include name, date of birth, role in the incident, uncompleted tasks associated with the person, etc. Similarly, sub-window 1310C provides information about a specific vehicle, and sub-window 1310D provides information about a specific witness statement. Sub-window 1302 may display a prioritized task list 1200 explained below with respect to FIG. 12.

The captured data file and/or the identifying information about the public safety incident may be received by the OICS 125 (at block 610) from at least one selected from the group of a records database (e.g., the DEMS 120), a data capture device (e.g., a data capture device 105) that captured the captured data file, the user device 115, and combinations thereof.

At block 615, the electronic processor of the electronic computing device may identify, based on the incident type and the role of an object associated with the public safety incident, an uncompleted task (i) that is to be performed by a public safety officer and (ii) that is associated with the object associated with the public safety incident. Despite all of the information that may be gathered during the incident and stored in the public safety record during or after the incident, expected tasks associated with one or more incidents may nevertheless remain uncompleted. For example, one or more witnesses may be expected to be identified and/or interviewed because they fled the scene of the incident before they could be identified and/or interviewed. Accordingly, the DEMS 120 may include many different public safety records each associated with a respective public safety incident, and many of these incidents may include uncompleted tasks that are expected to be completed by one or more public safety officers.

As explained above with respect to block 610, each public safety record stored in the DEMS 120 may be associated with a respective incident. Each incident may be characterized as being a certain type of incident that may be associated with a plurality of tasks that are expected to be completed by public safety officers during or after the incident. For example, for a homicide, the plurality of tasks may include identification of the victim, identification of one or more witnesses, identification of one or more suspects, interviewing of a witness and/or a suspect, etc. These expected tasks based on incident type and a role of the objects associated with the expected tasks based on incident type may be stored in, for example, a look-up table. These expected tasks can also be dynamically determined as explained in the above example involving two different incidents of the same type that involve a different number of people. For example, the number of people involved in two different incidents of the same type may be determined based on video analytics of a video of the incident, audio analytics of an audio recording of the incident, user input, or the like.

As a specific example, based on stored information in the DEMS 120, the electronic processor of the electronic computing device may determine that a homicide incident involves a single victim, a single suspect, and two witnesses. Based on the incident type being a homicide and the roles of the objects (i.e., the people involved in the incident), the electronic processor of the electronic computing device may determine the following tasks: (i) identification of the victim; (ii) identification of the suspect; (iii) identification of the first witness; (iv) identification of the second witness; (v) interviewing of the suspect; (vi) interviewing of the first witness; and (vii) interviewing of the second witness, among other possible tasks. The public safety record in the DEMS 120 may indicate that tasks (i)-(v) and (vii) have already been completed. Accordingly, the electronic processor of the electronic computing device may determine that only task (vi) relating to interviewing of the first witness is an uncompleted task. In some instances, the electronic processor of the electronic computing device may identify task (vi) as an uncompleted task (at block 615) that is to be performed by a public safety officer. The electronic processor may also identify that the object associated with the uncompleted task is the first witness.

While the above example includes identification of a single uncompleted task associated with a single object, in some situations, at block 615, the electronic processor of the electronic computing device may be configured to identify multiple uncompleted tasks associated with a public safety incident. These multiple uncompleted tasks may be associated with a single object or may be associated with different objects. For example, uncompleted tasks associated with a single object (e.g., a suspect) may include identifying a suspect, interviewing a suspect, and obtaining a deoxyribonucleic acid (DNA) sample from the suspect, among other tasks. As another example, an uncompleted task associated with another object (e.g., a gun) may include requesting and receiving results of a lab report (e.g., that indicates fingerprints, DNA, and/or other information found on the object during lab testing).

In some instances, at block 615, the uncompleted task is identified based additionally on a role and/or identity of a user requesting the information from the DEMS 120 via the user device 115 or the data capture device 105 (at block 605). For example, the user device 115 and/or the data capture device 105 may require the user to log into an account before the user requests information from the DEMS 120 (at block 605). Alternatively, the data capture device 105 may be associated with a particular user such that the electronic computing device may determine that a request from a certain data capture device 105 was generated by the particular user. The role of the user may be known or determined by accessing stored information (e.g., in a look-up table) that indicates a role of each public safety officer. Based on the role of the user, the electronic computing device may identify certain uncompleted tasks that are intended to be performed by a public safety officer whose role corresponds to the role of the user. For example, when the user is a detective, uncompleted tasks of interviewing witnesses may be identified by the electronic computing device. As another example, when the user is an officer who was on scene after responding to a call regarding the incident, uncompleted tasks of identifying people involved in the incident may be identified by the electronic computing device.

At block 620, the electronic processor of the electronic computing device may identify first data included the captured data file. In some instances, the first data was generated at least partially by monitoring the object associated with the uncompleted task identified at block 615. Continuing one of the above examples where the object is a first witness, the electronic computing device may analyze video files of the public safety record to identify the first data as including portions of videos that include footage of the first witness that still needs to be interviewed. Continuing another one of the above examples where the object is a gun, the electronic computing device may analyze audio files of the public safety record to identify the first data as including portions of videos and/or audio files that correspond to times when gunshots were recorded. As yet another example of the first data, the first data may include biometric data from a biometric sensor configured to monitor the object (e.g., a human).

In some instances, the electronic processor of the electronic computing device is configured to identify the first data included in the captured data file by at least one of or both of using video analytics to perform object recognition of the object in a video file and using audio analytics to perform sound recognition of the object in an audio file. For example, the sound recognition may include voice recognition of a voice of person such as a public safety officer. In some instances, the electronic processor of the electronic computing device may execute an artificial intelligence algorithm and/or a machine learning algorithm to identify the first data included in the captured data file.

At block 625, the electronic processor of the electronic computing device may determine a time period within the captured data file during which the first data is identified to be present within the captured data file. For example, the electronic processor may determine that the first witness is present in a first video from the time period between one minute and 30 seconds and one minute and 45 seconds into the first video. As another example, the electronic processor may determine that gunshots were recorded in a first audio file (and/or video file) between 15 seconds and 20 seconds into the audio file. In some instances, the electronic processor may identify multiple time periods during which the first data is present. For example, the electronic processor may determine that the first witness is present during multiple time periods in the first video. Each time period may include one or more portions of data (e.g., video frames).

Figure 7:
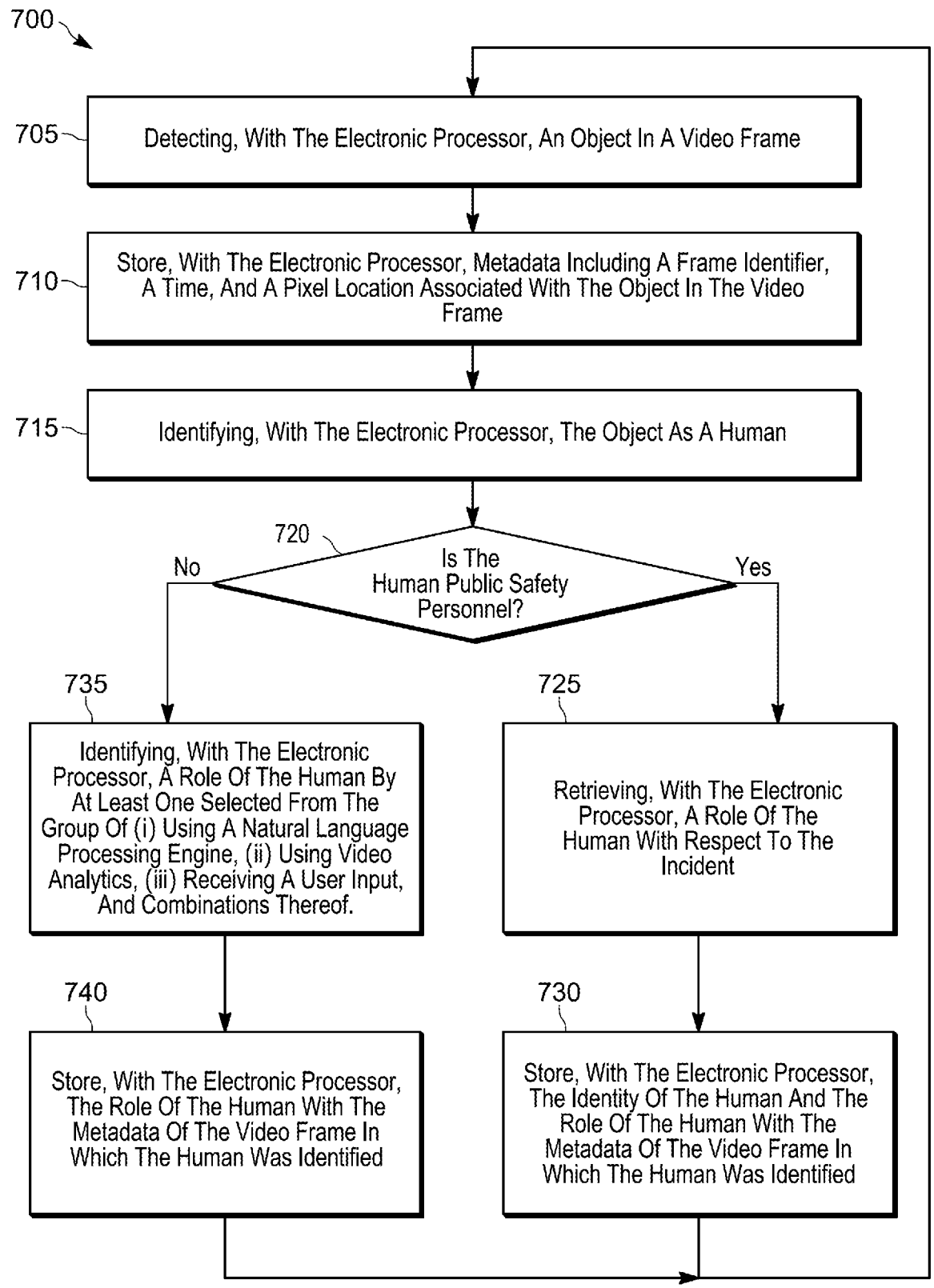
FIG. 7 is a flowchart of a method of identifying an object that was monitored in a captured data file and generating metadata (i) associated with the captured data file and (ii) corresponding to portions of the captured data file when the object was monitored according to one example aspect.

In some instances, the electronic processor of the electronic computing device may execute a method 700 shown in FIG. 7 as part of the method 600. In some instances, the method 700 may be executed to at least partially perform blocks 620 and 625 of the method 600. In some instances, the method 700 may be performed by the OICS 125 upon receiving captured data files from the data capture devices 105 in order to at least partially populate information stored in the DEMS 120 for a public safety record. In some instances, the method 700 may be performed by the OICS 125 in response to receiving a request from a user (e.g., via the data capture device 105 or the user device 115) to consume a specific captured data file and/or data files associated with a specific public safety incident for which a public safety record has been created and stored in the DEMS 120.

With respect to FIG. 7, at block 705, the electronic processor of the electronic computing device may detect an object in a video frame of a captured video file. The object may be a person or another object as described previously herein.

At block 710, the electronic processor of the electronic computing device stores metadata including a frame identifier, a time, and a pixel location associated with the object in the video frame (e.g., x and y coordinates corresponding to the location of the object in the video frame). In other words, the electronic processor stores a bookmark of information regarding the object in the video frame so that the specific time in the video and the pixel location in the video frame may be used by the electronic computing device as described in greater detail below.

In some instances, at block 715, the electronic processor of the electronic computing device may identify the object as a human. For example, using object recognition algorithms, the electronic processor may recognize a general shape of a human and identify the object as a human.

At block 720, the electronic processor of the electronic computing device may determine whether the human is public safety personnel. For example, the electronic processor may use biometric recognition techniques, facial recognition techniques, and/or the like to compare object information generated from the recognition techniques to stored public safety information. Specifically, the electronic processor may compare facial features of the object to facial features of a roster photo of one or more public safety officers to determine whether there is a correlation above a predetermined threshold (i.e., a match).

When the electronic processor determines that the human is public safety personnel, the method 700 proceeds to block 725. At block 725, the electronic processor may retrieve a role of the human with respect to a public safety incident associated with the video in which the human was identified. For example, the electronic processor may retrieve this information from a public safety record of the incident stored in the DEMS 120. At block 730, the electronic processor may store the identity of the human and the role of the human with the metadata (e.g., a time and a pixel location) of the video frame in which the human was identified. This additional information stored in the metadata of the video frame in which the human was identified enhances a bookmark of information regarding the object in the video frame. This enhanced information may be used by the electronic computing device to improve user experience as explained below with respect to, for example, block 630 of FIG. 6.

Returning to block 720, when the electronic processor determines that the human is not public safety personnel, the method 700 proceeds to block 735. At block 735, the electronic processor may identify a role of the human by at least one selected from the group of (i) using a natural language processing (NLP) engine, (ii) using video analytics, (iii) receiving a user input, and (iv) combinations thereof. For example, the electronic processor may use a NLP engine to analyze a conversation between humans in the video and/or may use video analytics to analyze actions taken by humans in the video. Using an artificial intelligence algorithm and/or a machine learning algorithm, the electronic processor may determine a suspected role of the human. For example, threatening words spoken by the human may indicate that the human is a potential suspect while fearful words such as "please stop" or "help me" may indicate that the human is a potential victim. As another example, threatening actions made by the human such as approaching another human or punching another human may indicate that the human is a potential suspect. On the other hand, defensive actions taken by the human such as backing away from another human or retreating to the fetal position may indicate that the human is a potential victim. In some instances, the suspected role of the human may be confirmed, revised, and/or initially entered by public safety personnel, for example, via a user input using the user device 115 and/or a data capture device 105.

At block 740, the electronic processor may store the role of the human with the metadata of the video frame in which the human was identified. As explained above with respect to block 730, this additional information stored in the metadata (e.g., a time and a pixel location) of the video frame in which the human was identified enhances the bookmark of information regarding the object in the video frame. This enhanced information may be used by the electronic computing device to improve user experience as explained below with respect to, for example, block 630 of FIG. 6.

As indicated in FIG. 7, after completion of block 730 and block 740, the method 700 may proceed back to block 705 to repeat the method 700 to identify additional objects in the same video file and/or a different video file. In some instances, through repetition of the method 700, the electronic processor of the electronic computing device is configured to receive a plurality of captured data files associated with a public safety incident, and analyze the plurality of captured data files to identify one or more captured data files from among the plurality of captured data files based on the captured data file being generated at least partially by monitoring the object. For example, the electronic computing device may be configured to analyze multiple captured data files included in a public safety record in order to identify which portions of which captured data files include footage or other data relating to an object associated with an uncompleted task.

While the method 700 is described above with reference to the object being a human, the method 700 may be similarly performed with respect to other objects such as a gun. For example, at block 715, the object may be identified as a gun. At block 720, the electronic processor may determine whether the gun is owned by a public safety agency. For example, due to the shape of the gun or a label located on the gun, the electronic processor may be able to determine that the gun is or is not owned by a public safety agency. This information about the gun may be used by the electronic processor to determine a role of a human holding the gun. Additionally, information about the gun may be stored with the metadata (e.g., a time and a pixel location) of the video frame in which the gun was identified to provide enhanced bookmark information of the video frames in which the gun was identified. For example, the enhanced bookmark information may indicate that the video frame includes a gun at a specific pixel location and that the gun is not owned by a public safety agency.

Returning back to the method 600 of FIG. 6, at block 630, the electronic processor of the electronic computing device may display an indication of the uncompleted task (identified at block 615) and at least one selected from the group of (i) the time period within the captured data file, (ii) the first data, (iii) a user-selectable link to allow a user to consume the first data, and (iv) combinations thereof. Examples of each type of displayed information (i), (ii), (iii) are explained below and illustrated in FIGS. 10-12. Each type of displayed information is configured to enhance user experience by associating an uncompleted task that involves a specific object with object detection of that specific object in a stored captured data file. Such association and display of the association (e.g., on a display 220, 320 of the data capture device 105 and/or the user device 115) allows public safety officers reviewing a public safety record to quickly and easily refresh their memory regarding a portion of an incident that involves the uncompleted task and the object.

FIG. 10 illustrates an example screenshot of the electronic computing device controlling a display 220, 320 to display an indication of the uncompleted task (identified at block 615) along with the first data (identified at block 620). In the example shown, the captured data file includes at least one selected from the group of an image, a video, and both. The indication of the uncompleted task may include an annotation 1005 (e.g., a textual annotation) corresponding to the uncompleted task. A reference herein to annotation 1005 may refer to annotation 1005A, 1005B, or both. As shown in FIG. 10, the electronic processor is configured to display the indication of the uncompleted task and the first data by displaying the annotation 1005 overlaid on the at least one selected from the group of the image, the video, and both in a first location on the display 220, 320 proximate to a second location on the display 220, 320 where an object 1010 associated with the uncompleted task is located within the at least one selected from the group of an image, a video, and both. A reference herein to object 1010 may refer to object 1010A, 110B, or both. For example, as shown in FIG. 10, each annotation 1005 may be overlaid on part of a body of a respective human (i.e., object 1010) but may not be overlaid on a face of the respective human. In some instances, an annotation 1005 may be overlaid next to/nearby an object 1010 in a video. In some instances, as the video is played, objects 1010 in the video move to different pixel locations within different video frames. The annotations 1005 may also move as the objects 1010 move, for example, to avoid covering a face of a human object and/or to avoid covering a non-human object.

As shown in FIG. 10, in some instances, the annotation 1005 includes additional information besides an indication of the uncompleted task. For example, the annotation 1005 may additionally indicate an identity of the object 1010 and/or one or more completed tasks associated with the object 1010.

As shown in FIG. 10, the annotation 1005A associated with object 1010A indicates an identity of the object 1010A ("ID03 Victim"), an uncompleted task associated with the object 1010A ("Obtain statement"), and a completed task associated with the object 1010A ("Establish identity"). Similarly, the annotation 1005B associated with object 1010B indicates an identity of the object 1010B ("ID04 Officer 2"), an uncompleted task associated with the object 1010B ("Complete incident report"), and a completed task associated with the object 1010B ("Establish identity"). In some instances, the tasks listed in the annotations 1005 indicate whether the task is complete or uncompleted using icons and/or based on color coding. For example, completed tasks may include a check next to the task and/or may be displayed in green text and/or strikethrough text while uncompleted tasks may include an exclamation point next to the task and/or may be displayed in yellow or red text.

In some instances, the annotation 1005 or parts of the annotation 1005 (e.g., a task name, an identifier of the object, etc.) are displayed as user-selectable links. In some instances, in response to receiving a user input that selects a user-selectable link, a corresponding section of the public safety record may be displayed on the display 220, 320. The displayed section of the public safety record may indicate additional details associated with the selected link. For example, when the "ID03 Victim" link of the annotation 1005A of FIG. 10 is selected, the corresponding section of the public safety record may indicate a name of the victim, an address of the victim, an annotation history of how the victim was identified, etc. In some instances, the corresponding section of the public safety record may be edited by the user via user input on the user device 115. As another example, when the "Establish identity" link associated with the "ID03 Victim" of the annotation 1005A of FIG. 10 is selected, information related to completion of the task may be displayed on the display 220, 320. For example, the displayed information may include a chronology of events that led to completion of the task, an officer that completed the task, etc.

In some instances, an option to transmit the portion of the augmented video to another device is displayed on the display 220, 320. For example, in response to determining that the "ID04 Officer2" link has been right-clicked by a mouse of the user device 115, a drop-down menu including an option to send the augmented video clip to a data capture device 105 of the officer corresponding to "ID04 Officer2" may be displayed to be optionally selectable by the user.

Figure 8:
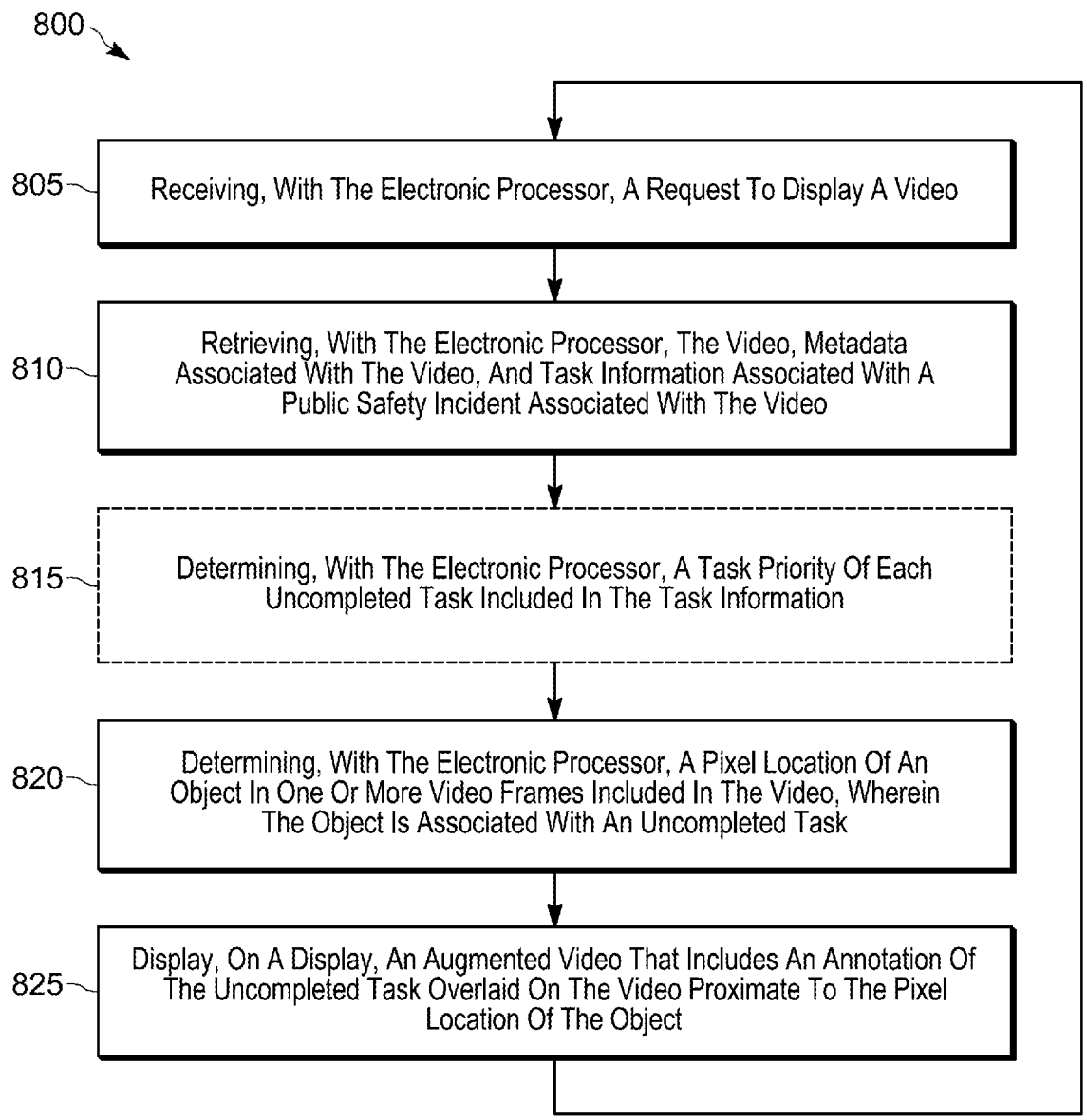
FIG. 8 is a flowchart of a method of generating an augmented video that includes annotations of uncompleted tasks overlaid on a source video according to one example aspect.

In some instances, to generate an augmented video that includes the annotations 1005 of uncompleted tasks overlaid on the video when the video is displayed, the electronic computing device uses the metadata generated by the method 700 of FIG. 7. To do so, in some instances, the electronic computing device performs a method 800 as shown in FIG. 8.

At block 805, the electronic processor of the electronic computing device may receive a request to display a video. For example, the request may be received from a data capture device 105 or the user device 115 in response to a user input received on the data capture device 105 or the user device 115. As another example, the request may be received from the OICS 125 after the OICS 125 has identified an object associated with an uncompleted task as being present in video footage of the video.

At block 810, the electronic processor of the electronic computing device may retrieve the video, metadata associated with the video (e.g., the metadata previously generated and stored during the execution of the method 700 of FIG. 7), and task information associated with a public safety incident associated with the video. For example, the video, the metadata, and the task information may be retrieved from a public safety record of the DEMS 120. In some instances, additional information may also be retrieved from the DEMS 120 such as an incident type of the incident.

In some instances, at block 815, the electronic processor of the electronic computing device determines a task priority of each uncompleted task included in the task information. In some instances, the electronic processor of the electronic computing device is configured to identify, based on the incident type, a plurality of uncompleted tasks that are to be performed by one or more public safety officers and that are each associated with one or more objects associated with the public safety incident. The electronic processor may be further configured to prioritize each of the uncompleted tasks of the plurality of uncompleted tasks based on at least one selected from the group of the incident type, a role of a respective object associated with each of the uncompleted tasks, and both to generate a priority of each of the uncompleted tasks. As indicated in FIGS. 10-12, the electronic processor may be further configured to display, on the display, an indication of the priority of each of the uncompleted tasks. For example, the indication of the priority of each of the uncompleted tasks may be included in an annotated video, on a displayed timeline, or in a prioritized list.

In some instances, each task stored in the public safety record may be stored with a default task priority level based on at least one selected from the group of the incident type, a role of a respective object associated with a respective task, and both. For example, Table 1 (below) includes example priority levels for example incident types and example roles of objects associated with each example task. In some instances, the default task priority levels may be adjusted, for example, via user input from a supervising public safety officer using the user device 115. In some instances, determining the task priority of each uncompleted task may include retrieving the stored priority levels of uncompleted tasks from the public safety record. In some instances, the priority of a task may be determined at least partially based on a role of the user who has requested to view information included in the public safety record. For example, a high priority task intended to be performed by fire department personnel may be determined to be a low priority task if the user is a member of the police department or is another public safety officer that is not fire department personnel.

| Incident Type | Role of Object | Task | Priority |
|---|---|---|---|
| Homicide | Witness | Witness statement | Priority 1 |
| | Weapon | Weapon identification | Priority 2 |
| | Scene | Scene documentation | Priority 3 |
| Traffic stop | Vehicle | Vehicle background check | Priority 1 |
| | Driver | Driver background check | Priority 2 |
| | Responding officer | Incident report | Priority 3 |
| Traffic collision | Responding officer | Incident report | Priority 1 |
| | Driver | Driver background | Priority 2 |
| | Driver | Driver narrative | Priority 3 |

At block 820, the electronic processor of the electronic computing device may determine a pixel location of an object in one or more video frames included in the video and that is associated with an uncompleted task. For example, the electronic processor may use the metadata generated and stored during the execution of the method 700 of FIG. 7 to determine one or more video frames that include footage of the object as well as a specific pixel location within each video frame where the object is located. In some instances, the pixel location includes a range of x-coordinates and y-coordinates that define an approximate area of the video frame in which the object is located.

At block 825, the electronic processor of the electronic computing device may display, on a display 220, 320, an augmented video that includes the annotation 1005 of the incomplete task overlaid on the source video proximate to the pixel location of the object 1010 as shown in FIG. 10. In some instances, the annotation 1005 may also indicate a task priority of an uncompleted task by, for example, using bolded text or red text for high priority uncompleted tasks and non-bolded text or yellow/orange text for lower priority uncompleted tasks.

As indicated in FIG. 8, the method 800 may be repeated to, for example, retrieve different videos and/or to update the augmented video as information in the public safety record of the DEMS 120 is updated.

Figure 11A:
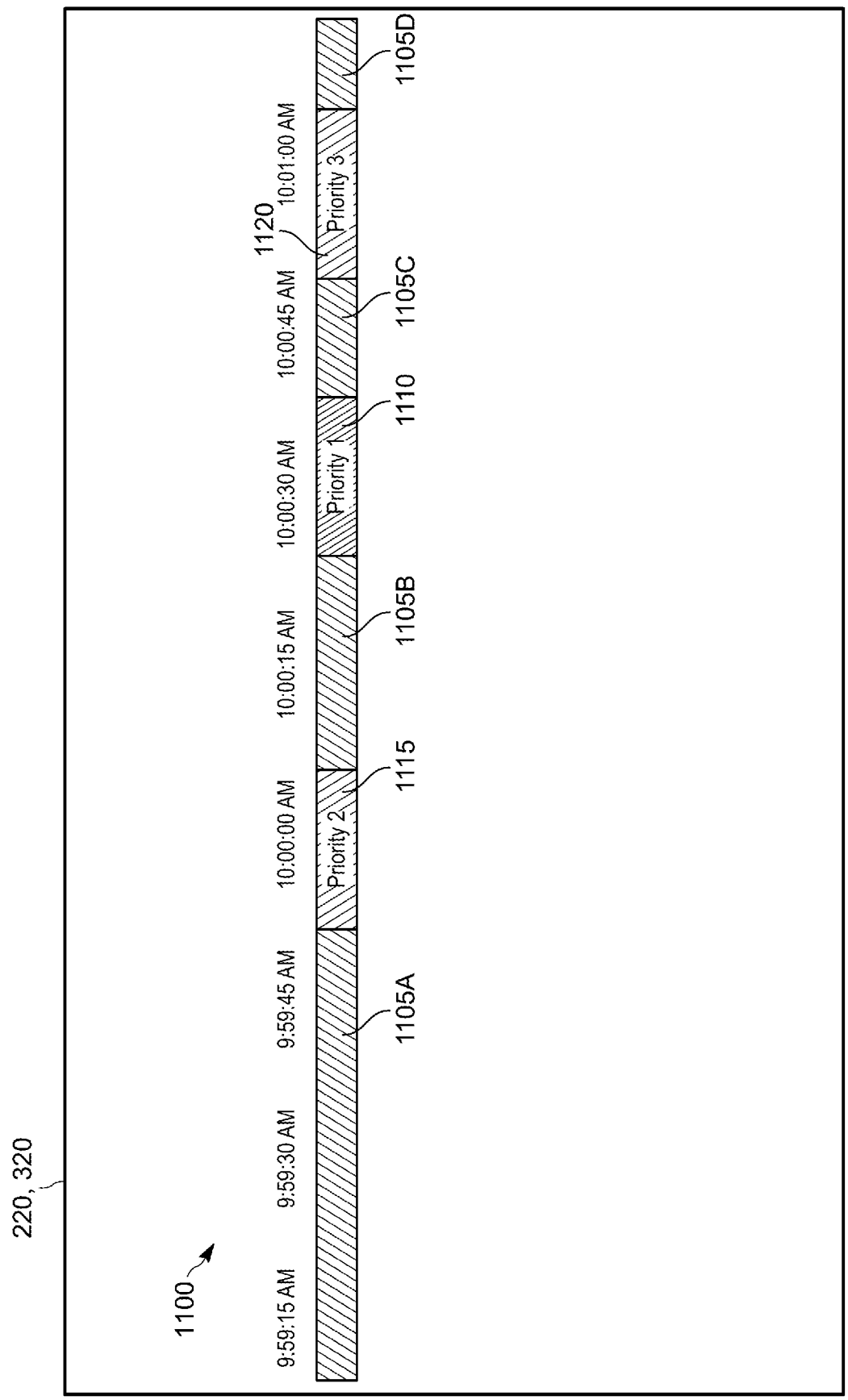
FIG. 11A illustrates a first screenshot of a display including a timeline that includes an indication of at least one uncompleted task associated with a public safety incident according to one example aspect.
Figure 11B:
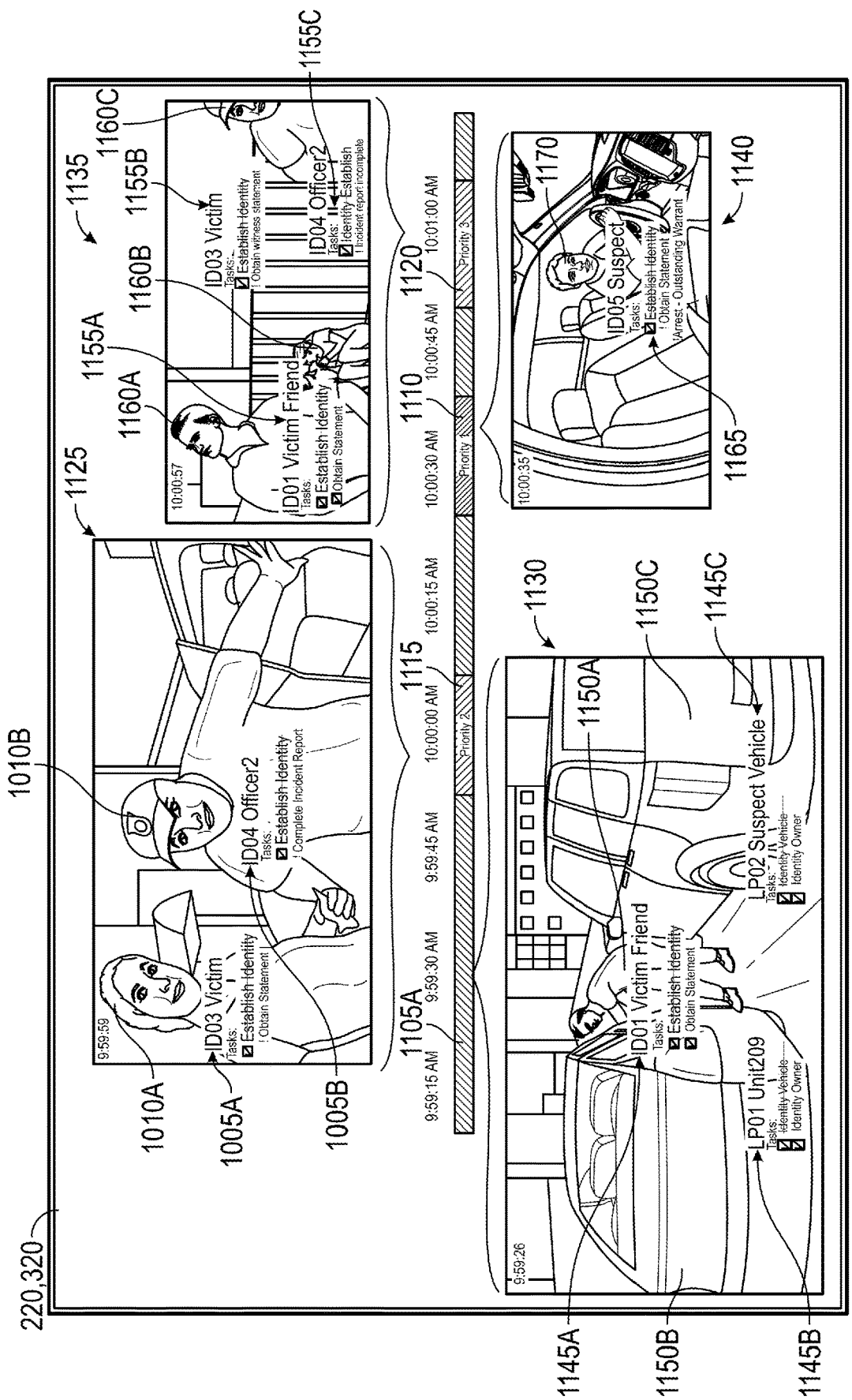
FIG. 11B illustrates a second screenshot of a display including the timeline of FIG. 11A and numerous pop-up windows to display portions of a video that each include an annotation of at least one uncompleted task associated with the public safety incident according to one example aspect.

Turning to another way to display an indication of an uncompleted task to a public safety officer, FIGS. 11A and 11B illustrate example screenshots of the electronic computing device controlling a display 220, 320 to display an indication of the uncompleted task (identified at block 615) along with the time period within the captured data file where data generated by monitoring the object associated with uncompleted task is located. In the example shown, the electronic processor is configured to display, on the display 220, 320, the indication of the uncompleted task and the time period within the captured data file by displaying a timeline 1100 corresponding to the captured data file, and by providing the indication of the uncompleted task within the time period within the captured data file on the timeline 1100.

In the example shown, the captured data file may be a video that is approximately two minutes long and may have been captured from approximately 9:59:00 AM to 10:01:00 AM. As shown in FIG. 11A, the timeline 1100 may include numerous different sections that are each displayed differently (e.g., color-coded) and/or with different labels or icons to allow the user to easily distinguish between different time periods within the captured data file. For example, time periods 1105 may be time periods in which there were not any objects monitored that are associated with uncompleted tasks. In some instances, such time periods 1105 may be color-coded green and may not include a label or icon that indicates a priority of an uncompleted task associated with an object included within the time period 1105 since no such object is included within the data during the time period

1105. A reference herein to time period 1105 may refer to time periods 1105A, 1105B, 1105C, or combinations thereof.

On the other hand, time period 1110 may be a time period in which an object associated with a high priority uncompleted task was monitored by the device that captured the captured data file. For example, when the captured data file is a video, the time period 1110 may be a time period of the video in which footage of the object (e.g., a first witness) associated with an uncompleted task (e.g., interviewing of the first witness) is viewable. In some instances, the time period 1110 may be color-coded red and/or may be labeled with a label ("Priority 1") or icon indicating the priority of the uncompleted task associated with the object that is viewable within the time period. Similarly, time periods 1115 and 1120 may include footage of one or more other objects that are associated with uncompleted tasks. Accordingly, these time periods 1115 and 1120 may be color-coded and/or labeled to indicate the priority of the uncompleted task associated with the object(s) that is(are) viewable within the respective time periods. For example, the time periods 1115 and 1120 may be color-coded yellow since the uncompleted task(s) associated with the object(s) in their respective footage has a lower priority than the uncompleted task associated with the object in the footage of the time period 1110.

In some instances, each time period may be color-coded depending on a characteristic of the captured data within the respective time period to indicate a potential usefulness of the captured data within the respective time period to the user. In some instances, the characteristic of the captured data used to determine a color of the respective time period includes a percentage of uncompleted tasks for the public safety incident associated with the captured data within the respective time period. For example, a public safety record may include eight uncompleted tasks associated with four different objects. A time period of a video that includes footage of two objects that are each associated with a single uncompleted task (i.e., two of the eight total uncompleted tasks) may be color-coded yellow because the portion of the video includes footage relevant to 25% of the uncompleted tasks for the public safety incident. As another example, a time period of a video that includes footage of two other objects that are each associated with three uncompleted tasks (i.e., six of the eight total uncompleted tasks) may be color-coded red because the portion of the video includes footage relevant to 75% of the uncompleted tasks.

In some instances, a time period may be color-coded red when the portion of the captured data includes data relevant to greater than or equal to 50% of the uncompleted tasks for the public safety incident. In some instances, a time period may be color-coded yellow when the portion of the captured data includes data relevant to between 30% and 50% of the uncompleted tasks for the public safety incident. In some instances, a time period may be color-coded green when the portion of the captured data includes data relevant to less than or equal to 30% of the uncompleted tasks for the public safety incident.

In some instances, the characteristic of the captured data used to determine a color of the respective time period includes a percentage of objects associated with uncompleted tasks for the public safety incident associated with the captured data within the respective time period. Continuing the above example, a public safety record may include eight uncompleted tasks associated with four different objects. The time period of the video that includes footage of two objects that are each associated with a single uncompleted task may be color-coded red because the portion of the video includes footage relevant to 50% of the objects (i.e., two of the four total objects) associated with uncompleted tasks for the public safety incident. As another example, the time period of the video that includes footage of two other objects that are each associated with three uncompleted tasks may also be color-coded red because the portion of the video includes footage relevant to 50% of the objects (i.e., two of the four total objects) associated with the uncompleted tasks for the public safety incident.

In some instances, a time period may be color-coded red when the portion of the captured data includes data relevant to greater than or equal to 50% of the objects associated with uncompleted tasks for the public safety incident. In some instances, a time period may be color-coded yellow when the portion of the captured data includes data relevant to between 30% and 50% of the objects associated with uncompleted tasks for the public safety incident. In some instances, a time period may be color-coded green when the portion of the captured data includes data relevant to less than or equal to 30% of the objects associated with uncompleted tasks for the public safety incident.

In some instances, the characteristic of the captured data used to determine a color of the respective time period includes a relevance level associated with the captured data within the respective time period. The electronic processor of the electronic computing device (e.g., the fourth electronic processor 505 of the OICS 125) may determine the relevance level, for example, based on an estimated usefulness of the captured data. For example, when a time period of video footage includes a single object associated with an uncompleted task and the object is far away from the camera in the video footage and not in clear focus (e.g., based on video analytics), the electronic processor may determine that the relevance level of the video footage is medium, and the time period may be color-coded yellow. As another example, when a time period of video footage includes one or more objects associated with uncompleted tasks and the objects are close to the camera and in clear focus (e.g., based on video analytics), the electronic processor may determine that the relevance level of the video footage is high, and the time period may be color-coded red. As yet another example, when a time period of video footage does not include any objects associated with uncompleted tasks, the electronic processor may determine that the relevance level of the video footage is low, and the time period may be color-coded green. In some instances, to determine the relevance level of a time period of a captured data file, the electronic processor may use at least one selected from the group of video quality, objection location within a field of view, one or both of the characteristics involving uncompleted task percentages and object percentages described above, the like, and any combinations thereof. In some instances, thresholds for each of these characteristics may be determined to evaluate the relevance level of the portion of the video. In some instances, values for these characteristics may be determined and aggregated to be compared to an aggregated threshold.

As an alternative to the example ranges with respect to any of the above-explained characteristics, in some instances, a time period may be color-coded green only when the portion of the captured data does not include any objects that are associated with uncompleted tasks (i.e., data relevant to 0% of the uncompleted tasks/objects associated with uncompleted tasks for the public safety incident). In such instances, a time period may be color-coded yellow when the portion of the captured data includes data relevant to between 0% and 50% of the uncompleted tasks/objects associated with uncompleted tasks for the public safety incident for the public safety incident. A time period may be color-coded red when the portion of the captured data includes data relevant to between 50% and 100% of the uncompleted tasks/objects associated with uncompleted tasks for the public safety incident for the public safety incident. The above ranges and colors are merely examples. Different ranges and/or additional or fewer ranges may be used. Different colors and/or additional or fewer colors may be used.

In some instances, the timeline 1100 may be displayed to indicate time periods in which objects associated with uncompleted tasks were monitored without indicating an exact priority associated with each time period (i.e., without differentiating between time periods with different priorities besides a "relevant" and "not relevant" distinction). For example, the electronic processor of the electronic computing device may be configured to provide the indication of the uncompleted task on the timeline 1100 by at least one of or both of color coding the time periods 1110, 1115, 1120 (i.e., relevant time periods) within the captured data file differently than at least one other time period 1105 (i.e., less relevant time periods) within the captured data file, labeling the time periods 1110, 1115, 1120 within the captured data file as being associated with the uncompleted task. However, the relevant time periods 1110, 1115, 1120 may not be distinguished from each other to indicate different priority levels of these relevant time periods 1110, 1115, 1120.

In some instances, in response to receiving a user input (e.g., on the user device 115 or the data capture device 105) that selects one of the time periods 1105, 1110, 1115, 1120, the electronic computing device may display additional information associated with the captured data file during the selected time period 1105, 1110, 1115, 1120. The additional information may include the priority of uncompleted tasks associated with objects that were monitored within the selected time period 1105, 1110, 1115, 1120. The additional information also may include an augmented video that includes annotations overlaid on the source video nearby the object in the video as shown FIG. 10 and as explained previously herein. For example, in response to receiving a user input that selects one of the time periods 1105, 1110, 1115, 1120, the electronic computing device may play the selected portion of the captured data file (e.g., an augmented video) in a pop-up window 1125 as shown in FIG. 11B or in a larger window similar to the screenshot shown in FIG. 10. Although not shown, the windows may include control buttons that allow the user to pause, stop, rewind, fast forward, etc. the selected portion of the augmented video.

As shown in FIG. 11B, multiple portions of the captured data file may be selected and displayed in pop-up windows 1125, 1130, 1135, 1140. For example, the pop-up window 1125 includes the same video frame, the same annotations 1005, and the same objects 1010 as shown in FIG. 11A.

As shown in the example of FIG. 11B, the pop-window 1130 includes respective annotations 1145 for each object 1150. However, none of the tasks associated with the objects 1150 are uncompleted. Thus, the annotations 1145 do not indicate that there are any uncompleted tasks. A reference herein to annotation 1145 may refer to annotation 1145A, 1145B, 1145C, or combinations thereof. A reference herein to object 1150 may refer to object 1150A, 11501B, 1150C, or combinations thereof. Additionally, the time period 1105A associated with the portion of captured data file shown in the pop-up window 1130 does not indicate that there are any uncompleted tasks associated with objects 1150 shown in the portion of the video corresponding to the time period 1105A because the time period 1105A may be shown in green without a label or icon for an uncompleted task.

The pop-up window 1135 includes respective annotations 1155 for each object 1160. The annotations 1155B and 1155C indicate that the objects 1160B and 1160 are associated with uncompleted tasks. In fact, in the example shown in FIG. 11B, the annotations 1155B and 1155C are the same as the annotations 1005A and 1005B since the objects 1160B and 1160C are the same as the objects 1010A and 1010B. The annotations 1155A indicate that the object 1160A is not associated with any uncompleted tasks. A reference herein to annotation 1155 may refer to annotation 1155A, 1155B, 1155C, or combinations thereof. A reference herein to object 1160 may refer to object 1160A, 1160B, 1160C, or combinations thereof.

The pop-up window 1140 includes an annotation 1165 for object 1170. As shown in the annotations 1165, the object 1170 is associated with multiple uncompleted tasks ("Obtain statement" and "Arrest—outstanding warrant"). In some instances, one of the tasks (e.g., the "arrest" task) may be a high priority task while the other task is a lower priority task. Accordingly, the annotations 1165 may indicate this difference in priority by using a different color text for the "arrest" task or using a different icon for the "arrest" task.

In some instances, a single time period within the captured data file may include multiple uncompleted tasks of different priorities (for example, time period 1110 of FIGS. 11A and 11B). In some instances, the timeline 1100 may be generated (e.g., color-coded) to indicate the relevance of different time periods based on the percentage of objects/uncompleted tasks examples described previously herein. Alternatively, the timeline 1100 may be generated to indicate that each time period includes the highest priority uncompleted task of the uncompleted tasks included in the respective time period to ensure that the user is aware of the highest priority uncompleted task in each time period. For example, in FIGS. 11A and 11B, the time period 1110 is shown in red and is labeled as "Priority 1" because a high priority arrest task is associated with the object 1170 shown in the video footage corresponding to the time period 1110.

While FIG. 11B illustrates numerous pop-up windows 1125, 1130, 1135, 1140 in which a video may be played and viewed, in some instances, the pop-up windows may only be displayed one at a time or may be displayed in a larger fashion (e.g., to be maximized on the display 220, 320 similar to the screenshot shown in FIG. 10).

As is evident from FIGS. 11A and 11B and their corresponding explanation, via user input, the user may select which portion of the captured data file to consume at any given time based on the indications of portions of the captured data file that include footage of one or more objects associated with respective uncompleted tasks of a public safety incident. Accordingly, the electronic computing device enhances user experience by allowing the user to quickly and efficiently locate portions of a captured data file that may be relevant to help the user recall details of an object associated with an uncompleted task.

Figure 9:
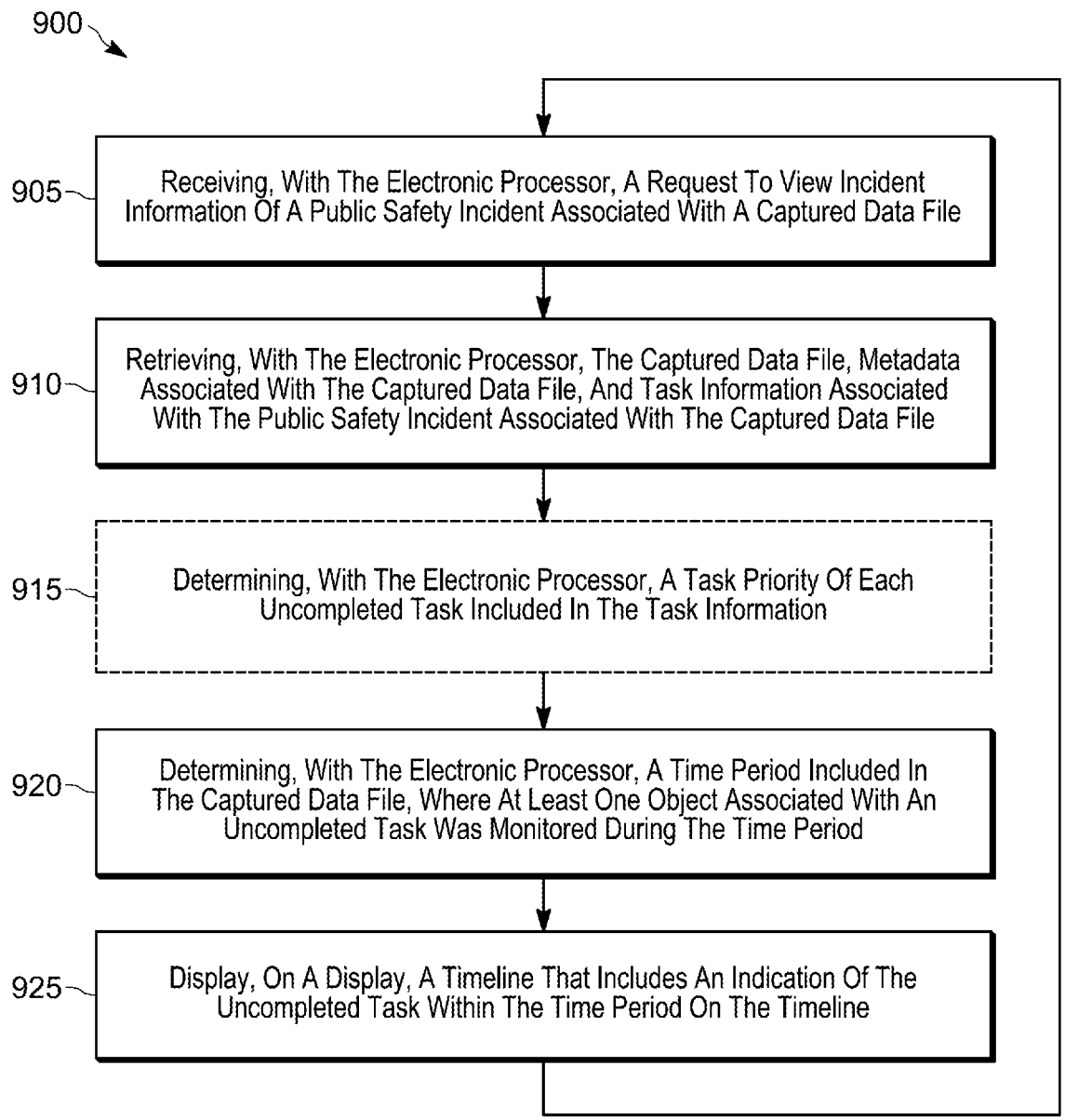
FIG. 9 is a flowchart of a method of generating a timeline that includes an indication of an uncompleted task associated with a public safety incident within a time period on the timeline according to one example aspect.

In some instances, to generate the timeline 1100 that includes one or more time periods within the captured data file where an object associated with an uncompleted task has been monitored, the electronic computing devices uses the metadata generated by the method 700 of FIG. 7. To do so, in some instances, the electronic computing device performs a method 900 as shown in FIG. 9. Some steps of the method 900 of FIG. 9 may be similar to steps included in the method 800 of FIG. 8.

At block 905, the electronic processor of the electronic computing device may receive a request to view incident information of a public safety incident (e.g., a timeline) associated with a captured data file. For example, the request may be received from a data capture device 105 or the user device 115 in response to a user input received on the data capture device 105 or the user device 115.

At block 910, the electronic processor of the electronic computing device may retrieve the captured data file, metadata associated with the captured data file (e.g., the metadata previously generated and stored during the execution of the method 700 of FIG. 7), and task information associated with a public safety incident associated with the captured data file. For example, the captured data file, the metadata, and the task information may be retrieved from a public safety record of the DEMS 120. In some instances, additional information may also be retrieved from the DEMS 120 such as an incident type of the incident. In some instances, block 910 is similar to block 810 of the method 800 of FIG. 8.

In some instances, at block 915, the electronic processor of the electronic computing device determines a task priority of each uncompleted task included in the task information. In some instances, block 915 is similar to block 815 of the method 800 of FIG. 8. Accordingly, the task priority of each uncompleted task included in the task information may be determined as described previously herein with respect to block 815 of FIG. 8.

At block 920, the electronic processor of the electronic computing device may determine a time period included in the captured data file where at least one object associated with an uncompleted task was monitored during the time period. For example, the electronic processor may use the metadata generated and stored during the execution of the method 700 of FIG. 7 to determine one or more video frames that include footage of the at least one object associated with an uncompleted task. As another example, the electronic processor may use the metadata generated and stored during the execution of the method 700 of FIG. 7 to determine one or more audio clips that include audio of the at least one object associated with an uncompleted task.

At block 925, the electronic processor of the electronic computing device may display, on a display 220, 320, the timeline 1100 of the captured data file that includes an indication of one or more uncompleted tasks within one or more time periods within the captured data file. For example, as shown in FIGS. 11A and 11B and as explained previously herein, the timeline 1100 may be displayed in a color-coded manner and/or with annotations to provide the indication(s) of one or more uncompleted tasks within one or more time periods within the captured data file. Also as explained previously herein, in instances in which block 915 is performed, the timeline 1100 may also indicate task priorities of different uncompleted tasks by, for example, using different annotations, fonts, and/or colors.

As indicated in FIG. 9, the method 900 may be repeated to, for example, retrieve different captured data files and/or to update the timeline 1100 as information in the public safety record of the DEMS 120 is updated.

Turning to yet another way to display an indication of an uncompleted task to a public safety officer, in some instances, FIG. 12 illustrates an example screenshot of the electronic computing device controlling a display 220, 320 to display an indication of the uncompleted task (identified at block 615) along with one or more user-selectable links 1205 within a prioritized task list 1200 of uncompleted tasks associated with the public safety incident. In the example shown, the user-selectable links 1205 are displayed separately from a priority and description of the uncompleted tasks. In other instances, the user-selectable links 1205 may include text describing the priority and/or the description of the uncompleted tasks. A reference herein to user-selectable links 1205 may refer to user-selectable link 1205A, 1205B, 1205C, or combinations thereof.

To display the prioritized task list 1200, the electronic processor of the electronic computing device may perform a method similar to the method 900 of FIG. 9 described above. For example, the electronic computing device may perform blocks 905, 910, 920, and optionally block 915. The electronic computing device may then perform an alternative block to block 925 by displaying the prioritized task list 1200 of user-selectable links 1205 instead of displaying the timeline 1100. Displaying of either type of information (e.g., the timeline 1100 or the prioritized task list 1200) is similar in that the electronic computing device may receive a user input to select a portion of a captured data file (e.g., either by selecting a portion of the timeline 1100 or by selecting a user-selected link 1205). In response to receiving the user input, the electronic computing device may cause the data capture device 105 or the user device 115 to play the portion of the captured data file for consumption by the user.

Similar to the displaying of the timeline 1100 and the annotations 1005, in some instances, information displayed with each of the user-selectable links 1205 may be color-coded or labeled to indicate a priority level of an uncompleted task associated with the portion of the captured data file corresponding to the user-selectable link 1205. In some instances, the explanations of priority and displaying of priority information with respect to other instances (e.g., related to the timeline 1100 and the annotations 1005) also apply to the prioritized task list 1200.

In some instances, the prioritized task list 1200 may include user-selectable links 1205 to different captured data files associated with the same particular public safety incident. For example, a first link 1205A may correspond to a first video of a first incident while a second link 1205B corresponds to a second video of the first incident or an audio recording of the first incident. Additionally, in some instances, a single uncompleted task may include multiple user-selectable links 1205 to different portions of the same captured data file and/or to portions of different captured data files.

In some instances, the electronic computing device may receive a user input that indicates whether the user prefers to view a summary of uncompleted tasks for a particular incident in the from of the timeline 1100 or in the form of the prioritized task list 1200. In some instances, the prioritized task list 1200 may be displayed in a pop-up window in response to receiving a user input that selects a time period 1110, 1115, 1120 on the timeline 1100. For example, the prioritized task list 1200 in the pop-up window may indicate the priority of a plurality of uncompleted tasks that are associated with the selected time period 1110, 1115, 1120. In some instances, the pop-up window may include additional information about the incident such as an incident type and a brief summary of the incident. In some instances, the pop-window displaying the prioritized task list 1200 may be displayed in response to receiving a user input selecting a specific public safety record from among a plurality of public safety records.

In some embodiments, the prioritized task list 1200 may be displayed in response to a user input that selects a "tasks" title in a public safety incident report as shown in FIG. 13. These tasks may involve any one or a number of different entities/elements/objects associated with the incident record and may not be specific to a certain person, vehicle, etc. (i.e., a general uncompleted task list for the incident). In some embodiments, the title "persons" of the incident report shown in FIG. 13 may be a user-selectable link. In response to the title "persons" being selected via a user input, a sub-window 1310 may be displayed that is similar to the sub-window 1302 but that only includes uncompleted tasks associated with persons associated with the incident. Similarly, in response to the "tasks" text of the sub-window 1310A, the sub-window 1310A may be updated to display a prioritized task list similar to that shown in sub-window 1302 but that only includes uncompleted tasks associated with Jill Adams. Alternatively, another sub-window 1310 may be displayed with this information. Accordingly, different lists of prioritized tasks may be displayed at the public safety record level, at a record type level, and/or at a specific entity/element/object level. As indicated by FIG. 13, the incident record information displayed on the screen 220, 320 may allow a user to view different information (and different uncompleted tasks) associated with specific entities/elements/objects or record types (e.g., types of objects) of the incident and/or general information (and uncompleted tasks) associated with the incident overall.

In other words, in some instances, the prioritized task list 1200 of uncompleted tasks may be generated at one or more different levels of data granularity. For example, the prioritized task list 1200 may include all uncompleted tasks for a particular incident/public safety record. As another example and as mentioned above, the prioritized task list 1200 may merely include uncompleted tasks associated with objects that are included in first video footage of a first portion of a first video. In other words, uncompleted tasks for the incident that are associated with other objects that are not included in the first video footage may not be included in a prioritized task list 1200 generated in a pop-window in response to the first portion of the first video being selected via a user input. In some instances, the prioritized task list 1200 may include all uncompleted tasks associated with a particular object or category of objects for a particular incident/public safety record. For example, the prioritized task list 1200 may be generated to include all uncompleted tasks associated with persons or witnesses in general or may be generated to include all uncompleted tasks associated with a specific witness. In some instances, the prioritized task list 1200 may include all uncompleted tasks associated with a particular object or category of objects for multiple incidents/public safety records. For example, the prioritized task list 1200 may include all uncompleted tasks associated with a specific witness regardless of whether the uncompleted tasks are associated with the same incident/public safety record.

As indicated by the above explanation and FIG. 13, sub-windows 1302, 1310 may be used to display a prioritized task list 1200 of uncompleted tasks at a requested data granularity level. Display of such information as a part of viewing a public safety incident report may allow a user to quickly view relevant videos regarding specific objects or specific types of objects to refresh their memory about one or more uncompleted tasks associated with the respective objects. Additionally or alternatively, sub-windows 1302, 1310 with a prioritized task list 1200 of uncompleted tasks may be displayed in an augmented video or in association with a displayed timeline as indicated and explained above with respect to FIGS. 10 and 11B (e.g., in the form of an annotation such as annotation 1005B of FIG. 10).

In the foregoing specification, specific examples have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "cabout" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
an electronic processor configured to
receive a captured data file associated with a public safety incident,
receive identifying information about the public safety incident, wherein the identifying information about the public safety incident includes an incident identifier, an incident type, and a role of an object associated with the public safety incident,
identify, based on the incident type and the role of the object associated with the public safety incident, an uncompleted task that is to be performed by a public safety officer and that is associated with the object associated with the public safety incident,
identify first data included in the captured data file, wherein the first data was generated at least partially by monitoring the object,
determine a time period within the captured data file during which the first data is identified to be present within the captured data file, and
display, on a display, an indication of the uncompleted task and at least one selected from the group consisting of the time period within the captured data file, the first data, a user-selectable link to allow a user to consume the first data, and combinations thereof.

2. The electronic computing device of claim 1, wherein the captured data file includes at least one selected from the group consisting of an image, a video, and both, and wherein the indication of the uncompleted task includes an annotation corresponding to the uncompleted task; and
wherein the electronic processor is configured to display, on the display, the indication of the uncompleted task and the first data by displaying the annotation overlaid on the at least one selected from the group consisting of the image, the video, and both in a first location on the display proximate to a second location on the display where the object is located within the at least one selected from the group consisting of an image, a video, and both.

3. The electronic computing device of claim 1, wherein the electronic processor is configured to display, on the display, the indication of the uncompleted task and the time period within the captured data file by
displaying, on the display, a timeline corresponding to the captured data file, and
providing the indication of the uncompleted task within the time period within the captured data file on the timeline.

4. The electronic computing device of claim 3, wherein the electronic processor is configured to provide the indication of the uncompleted task on the timeline by at least one of or both of:
color coding the time period within the captured data file differently than at least one other time period within the captured data file; and
labeling the time period within the captured data file as being associated with the uncompleted task.

5. The electronic computing device of claim 1, wherein the electronic processor is configured to display, on the display, the indication of the uncompleted task and the user-selectable link within a prioritized list of uncompleted tasks associated with the public safety incident; and
wherein the electronic processor is configured to display, on the display, the first data in response to receiving a user input that selects the user-selectable link.

6. The electronic computing device of claim 1, wherein the electronic processor is configured to:
identify, based on the incident type, a plurality of uncompleted tasks that are to be performed by one or more public safety officers and that are each associated with the object or one or more other objects associated with the public safety incident;
prioritize each of the uncompleted tasks of the plurality of uncompleted tasks, based on at least one selected from the group of the incident type, a role of a respective object associated with each of the uncompleted tasks, and both, to generate a priority of each of the uncompleted tasks; and
display, on the display, an indication of the priority of each of the uncompleted tasks.

7. The electronic computing device of claim 1, wherein the captured data file includes at least one selected from the group consisting of an image file, a video file, an audio file, a telemetry data file, and combinations thereof.

8. The electronic computing device of claim 1, wherein the electronic processor is configured to:
receive a plurality of captured data files associated with the public safety incident; and
analyze the plurality of captured data files to identify the captured data file from among the plurality of captured data files based on the captured data file being generated at least partially by monitoring the object.

9. The electronic computing device of claim 1, wherein the electronic processor is configured to identify the first data included in the captured data file by at least one of or both of:
using video analytics to perform object recognition of the object in a video file; and
using audio analytics to perform sound recognition of the object in an audio file.

10. The electronic computing device of claim 1, wherein the electronic processor is configured to receive the captured data file and the identifying information about the public safety incident from a records database, a data capture device that captured the captured data file, or both the records database and the data capture device that captured the captured data file.

11. A method of displaying data, the method comprising:
receiving, with an electronic processor of an electronic computing device, a captured data file associated with a public safety incident;
receiving, with the electronic processor, identifying information about the public safety incident, wherein the identifying information about the public safety incident includes an incident identifier, an incident type, and a role of an object associated with the public safety incident;
identifying, with the electronic processor and based on the incident type and the role of the object associated with the public safety incident, an uncompleted task that is to be performed by a public safety officer and that is associated with the object associated with the public safety incident;
identifying, with the electronic processor, first data included in the captured data file, wherein the first data was generated at least partially by monitoring the object;
determining, with the electronic processor, a time period within the captured data file during which the first data is identified to be present within the captured data file; and
displaying, on a display, an indication of the uncompleted task and at least one selected from the group consisting of the time period within the captured data file, the first data, a user-selectable link to allow a user to consume the first data, and combinations thereof.

12. The method of claim 11, wherein the captured data file includes at least one selected from the group consisting of an image, a video, and both, and wherein the indication of the uncompleted task includes an annotation corresponding to the uncompleted task; and
wherein displaying the indication of the uncompleted task and the at least one selected from the group consisting of the time period within the captured data file, the first data, the user-selectable link to allow the user to consume the first data, and combinations thereof includes displaying the first data and displaying the annotation overlaid on the at least one selected from the group consisting of an image, a video, and both in a first location on the display proximate to a second location on the display where the object is located within the at least one selected from the group consisting of an image, a video, and both.

13. The method of claim 11, wherein displaying the indication of the uncompleted task and the at least one selected from the group consisting of the time period within the captured data file, the first data, the user-selectable link to allow the user to consume the first data, and combinations thereof includes displaying the time period within the captured data file, and further comprising:
displaying, on the display, a timeline corresponding to the captured data file; and
providing the indication of the uncompleted task within the time period within the captured data file on the timeline.

14. The method of claim 13, wherein providing the indication of the uncompleted task on the timeline includes at least one of or both of:
color coding the time period within the captured data file differently than at least one other time period within the captured data file; and
labeling the time period within the captured data file as being associated with the uncompleted task.

15. The method of claim 11, wherein displaying the indication of the uncompleted task and the at least one selected from the group consisting of the time period within the captured data file, the first data, the user-selectable link to allow the user to consume the first data, and combinations thereof includes displaying the user-selectable link within a prioritized list of uncompleted tasks associated with the public safety incident; and
wherein the electronic processor is configured to display, on the display, the first data in response to receiving a user input that selects the user-selectable link.

16. The method of claim 11, further comprising:
identifying, with the electronic processor and based on the incident type, a plurality of uncompleted tasks that are to be performed by one or more public safety officers and that are each associated with the object or one or more other objects associated with the public safety incident;
prioritizing, with the electronic processor, each of the uncompleted tasks of the plurality of uncompleted tasks, based on at least one selected from the group of the incident type, a role of a respective object associated with each of the uncompleted tasks, and both, to generate a priority of each of the uncompleted tasks; and
displaying, on the display, an indication of the priority of each of the uncompleted tasks.

17. The method of claim 11, wherein the captured data file includes at least one selected from the group consisting of an image file, a video file, an audio file, a telemetry data file, and combinations thereof.

18. The method of claim 11, further comprising:
receiving, with the electronic processor, a plurality of captured data files associated with the public safety incident; and
analyzing, with the electronic processor, the plurality of captured data files to identify the captured data file from among the plurality of captured data files based on the captured data file being generated at least partially by monitoring the object.

19. The method of claim 11, wherein identifying the first data included in the captured data file includes at least one of or both of:
using video analytics to perform object recognition of the object in a video file; and
using audio analytics to perform sound recognition of the object in an audio file.

20. The method of claim 11, wherein receiving the captured data file and the identifying information about the public safety incident includes receiving the captured data file and the identifying information about the public safety incident from a records database, a data capture device that captured the captured data file, or both the records database and the data capture device that captured the captured data file.

* * * * *